(12) United States Patent
Borck et al.

(10) Patent No.: US 8,830,676 B2
(45) Date of Patent: Sep. 9, 2014

(54) BATTERY MANAGEMENT SYSTEM

(75) Inventors: Felix Von Borck, Barmstadt (DE);
Björn Eberleh, Alsbach-Hähnlein (DE)

(73) Assignee: AKASOL GmbH (DE)

( * ) Notice: Subject to any disclaimer, the term of this patent is extended or adjusted under 35 U.S.C. 154(b) by 261 days.

(21) Appl. No.: 13/266,024

(22) PCT Filed: Apr. 23, 2010

(86) PCT No.: PCT/EP2010/002522
§ 371 (c)(1),
(2), (4) Date: Apr. 16, 2012

(87) PCT Pub. No.: WO2010/121829
PCT Pub. Date: Oct. 28, 2010

(65) Prior Publication Data
US 2012/0188714 A1 Jul. 26, 2012

(30) Foreign Application Priority Data
Apr. 24, 2009 (DE) .......................... 10 2009 018 787

(51) Int. Cl.
| | |
|---|---|
| *H05K 7/20* | (2006.01) |
| *H05K 7/00* | (2006.01) |
| *H01M 10/6568* | (2014.01) |
| *H01M 10/48* | (2006.01) |
| *H01M 10/44* | (2006.01) |
| *H01M 10/625* | (2014.01) |
| *H01M 10/663* | (2014.01) |
| *H01M 2/10* | (2006.01) |
| *H01M 10/647* | (2014.01) |
| *H01M 10/653* | (2014.01) |
| *H01M 10/613* | (2014.01) |
| *H01M 10/6553* | (2014.01) |
| *H01M 10/052* | (2010.01) |

(52) U.S. Cl.
CPC ........ *H01M 2/1077* (2013.01); *H01M 10/5077* (2013.01); *Y02E 60/12* (2013.01); *H01M 10/052* (2013.01); *H01M 10/486* (2013.01); *H01M 10/443* (2013.01); *H01M 10/441* (2013.01); *H01M 10/5016* (2013.01); *H01M 10/5095* (2013.01); *H01M 2/1061* (2013.01); *H01M 10/5032* (2013.01); *H01M 10/504* (2013.01); *H01M 10/5004* (2013.01); *Y02T 10/7011* (2013.01); *H01M 10/482* (2013.01); *H01M 10/5051* (2013.01)
USPC ................ 361/688; 361/679.46; 361/679.54; 361/704; 361/748; 429/50; 429/62; 429/96; 429/120; 429/128; 165/80.2; 165/104.33

(58) Field of Classification Search
USPC .............. 361/679.46–679.54, 688, 689, 698, 361/699, 714, 715, 748, 790–794; 429/62, 429/71, 72, 90, 96, 99, 120, 129, 100, 429/151–159, 149, 176, 130; 439/500, 510, 439/627; 165/80.2, 80.4, 104.33, 185; 320/107, 112, 116; 174/16.3, 88 B, 174/71 B, 72 B, 99 B; 318/138, 254, 439, 318/538, 722, 801
See application file for complete search history.

(56) References Cited

U.S. PATENT DOCUMENTS

| | | | | |
|---|---|---|---|---|
| 4,396,689 | A * | 8/1983 | Grimes et al. ................ | 429/105 |
| 5,641,587 | A * | 6/1997 | Mitchell et al. ............... | 429/90 |
| 5,674,641 | A * | 10/1997 | Cheu ............................ | 429/306 |
| 5,756,227 | A * | 5/1998 | Suzuki et al. .................. | 429/62 |
| 6,002,240 | A * | 12/1999 | McMahan et al. ............ | 320/150 |
| 6,733,919 | B1 * | 5/2004 | Nguyen et al. ................ | 429/99 |
| 7,074,517 | B2 * | 7/2006 | Higashino ..................... | 429/66 |
| 7,270,576 | B2 * | 9/2007 | Kim et al. ..................... | 439/627 |
| 7,291,422 | B2 * | 11/2007 | Oogami et al. ............... | 429/152 |
| 7,572,549 | B2 | 8/2009 | Wegner | |
| 7,758,999 | B2 | 7/2010 | Choo et al. | |
| 7,807,289 | B2 | 10/2010 | Seiler et al. | |
| 7,819,700 | B2 * | 10/2010 | Kruger et al. ................. | 439/627 |
| 7,834,589 | B2 * | 11/2010 | Park et al. ..................... | 320/135 |
| 7,879,485 | B2 * | 2/2011 | Yoon et al. .................... | 429/128 |
| 8,067,111 | B2 * | 11/2011 | Koetting et al. .............. | 429/120 |
| 8,084,154 | B2 * | 12/2011 | Scheucher ..................... | 429/62 |
| 8,153,290 | B2 * | 4/2012 | Hermann et al. ............. | 429/120 |

| | | | |
|---|---|---|---|
| 8,268,474 B2* | 9/2012 | Kim et al. | 429/149 |
| 8,409,743 B2* | 4/2013 | Okada et al. | 429/120 |
| 8,483,886 B2* | 7/2013 | Onnerud et al. | 700/297 |
| 2001/0031392 A1 | 10/2001 | Ogata et al. | |
| 2004/0021442 A1* | 2/2004 | Higashino | 320/112 |
| 2006/0083980 A1 | 4/2006 | Choo et al. | |
| 2006/0197505 A1* | 9/2006 | Park et al. | 320/134 |
| 2006/0246350 A1* | 11/2006 | Takayama et al. | 429/178 |
| 2007/0018610 A1 | 1/2007 | Wegner | |
| 2008/0053716 A1 | 3/2008 | Scheucher | |
| 2008/0152993 A1 | 6/2008 | Seiler et al. | |
| 2009/0197160 A1* | 8/2009 | Fujiwara et al. | 429/146 |
| 2010/0104927 A1* | 4/2010 | Albright | 429/50 |
| 2012/0092018 A1* | 4/2012 | Scheucher | 324/426 |

FOREIGN PATENT DOCUMENTS

| | | |
|---|---|---|
| DE | 198 10 746 A1 | 9/1999 |
| DE | 10 2005 031 504 A1 | 1/2007 |
| DE | 10 2006 061 270 A1 | 6/2008 |
| DE | 10 2007 017 980 A1 | 10/2008 |
| EP | 1 523 051 A2 | 4/2005 |
| EP | 2 043 189 A1 | 4/2009 |
| GB | 388026 A | 2/1933 |
| WO | 02/095843 A2 | 11/2002 |
| WO | 2005/119813 A2 | 12/2005 |
| WO | 2006/068373 A1 | 6/2006 |
| WO | 2010121829 A1 | 10/2010 |
| WO | 2010121831 A1 | 10/2010 |

OTHER PUBLICATIONS

Search report dated Oct. 19, 2010 of corresponding German Patent application No. 10 2009 018 787.1, 4 pages.

English translation of search report dated Oct. 19, 2010 of corresponding German Patent application No. 10 2009 018 787I.1, 5 pages.

* cited by examiner

*Primary Examiner* — Michail V Datskovskiy

(74) *Attorney, Agent, or Firm* — The Webb Law Firm

(57) ABSTRACT

The present invention relates to a battery management system for a battery module comprising a plurality of cells connected to one another which each have a positive and a negative terminal. The invention is in particular concerned with a battery management system which is used with accumulators especially lithium ion cells for forming a traction battery or a traction battery module for vehicles with an electrical drive drain. Such battery modules can for example be used in electrical vehicles, hybrid vehicles with combustion engines or hybrid vehicles with fuel cells, can however also be used for other purposes, for example for stationary applications or for small traction applications, such as for example in a wheelchair.

25 Claims, 21 Drawing Sheets

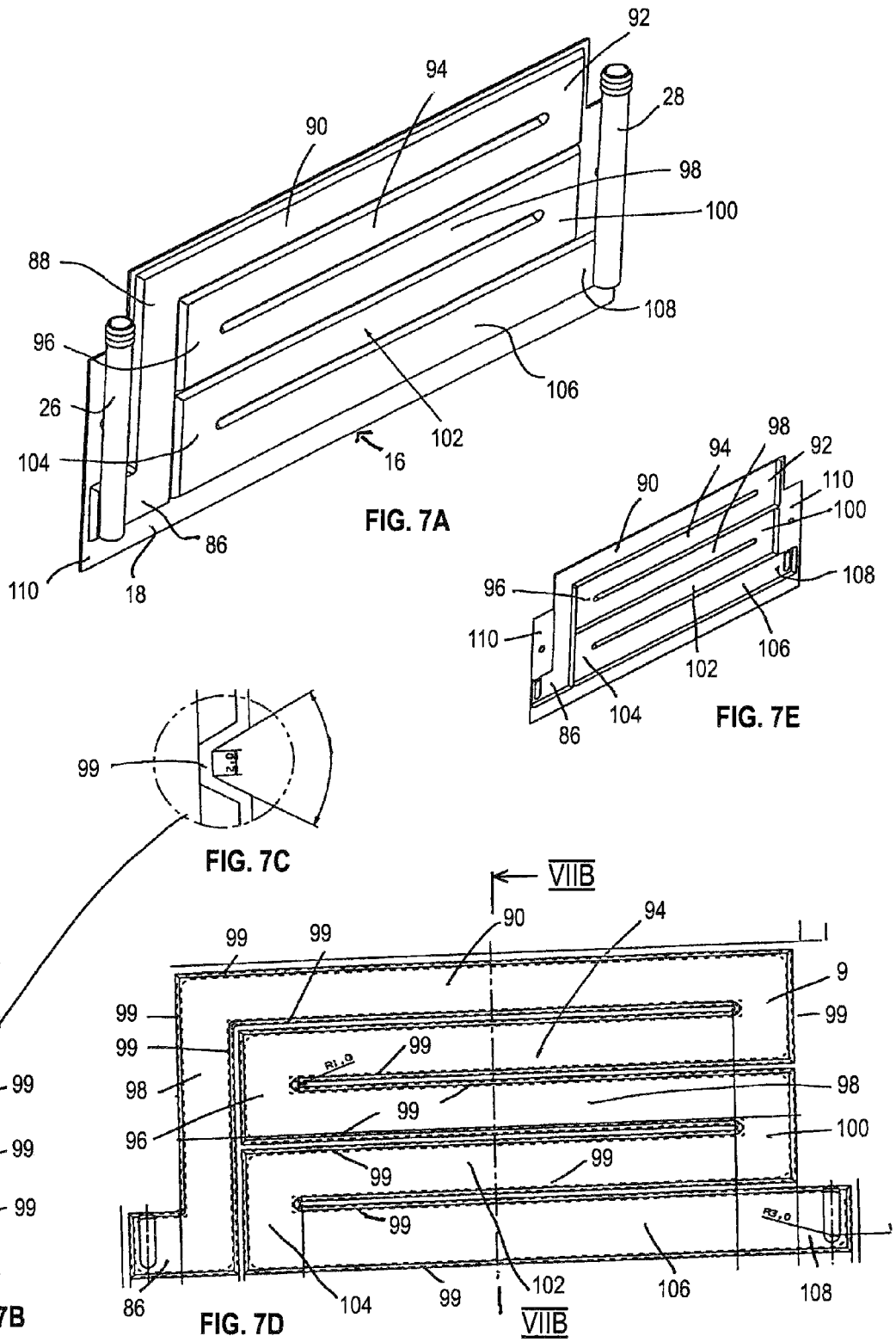

1,5C RATE (5,4W PER CELL)

| TUBE DIAMETER 8mm | | | | | NUMBER OF MODULES IN SERIES | | | | | | | | | | |
|---|---|---|---|---|---|---|---|---|---|---|---|---|---|---|---|
| | | 1 | | 2 | | 3 | | | 4 | | | 5 | | |
| | | kWh | dT | kWh | dT | kWh | dV/dt | dT | kWh | dV/dt | dT | kWh | dV/dt | dT |
| *1 | 1 | 2 | 0,00 | 4 | 0,00 | 6 | 0,00 | 0,00 | 8 | 0,00 | 0,00 | 10 | 0,00 | 0,00 |
| | 2 | 4 | 0,25 | 8 | 0,84 | 12 | 112,30 | 1,74 | ● 16 | 88,50 | ● 2,94 | 20 | 73,20 | 4,44 |
| | 3 | 6 | 0,33 | 12 | 1,02 | ● 18 | 95,90 | ● 2,03 | 24 | 77,30 | 3,36 | 30 | 65,00 | 5,00 |
| | 4 | 8 | 0,39 | ● 16 | ●1,17 | 24 | 85,10 | 2,29 | ● 32 | 69,60 | ● 3,73 | 40 | 59,20 | 5,49 |
| | 5 | 10 | 0,45 | 20 | 1,31 | 30 | 77,20 | 2,52 | 40 | 63,80 | 4,07 | 50 | 54,70 | 5,94 |
| | 6 | 12 | 0,50 | 24 | 1,44 | ● 36 | 71,10 | ● 2,74 | ● 48 | 59,20 | ●4,39 | 60 | 51,10 | 6,36 |
| | 7 | 14 | 0,55 | 28 | 1,56 | 42 | 66,20 | 2,94 | ● 56 | 55,50 | ● 4,68 | 70 | 48,10 | 6,75 |
| | 8 | ● 16 | ●0,60 | ●32 | ●1,67 | ● 48 | 62,10 | ● 3,14 | 64 | 52,30 | 4,97 | 80 | 45,50 | 7,14 |
| | 9 | ● 18 | ●0,65 | ●36 | ●1,78 | ● 54 | 58,60 | ● 3,33 | 72 | 49,60 | 5,24 | 90 | 43,30 | 7,50 |
| | 10 | 20 | 0,69 | 40 | 1,89 | 60 | 55,60 | 3,51 | 80 | 47,20 | 5,51 | 100 | 41,40 | 7,85 |

FIG. 12A

*1 NUMBER OF MODULES IN PARALLEL

2C RATE (9,6W PER CELL)

| TUBE DIAMETER 8mm | | | | | NUMBER OF MODULES IN SERIES | | | | | | | | | | |
|---|---|---|---|---|---|---|---|---|---|---|---|---|---|---|---|
| | | 1 | | 2 | | 3 | | | 4 | | | 5 | | |
| | | kWh | dT | kWh | dT | kWh | dV/dt | dT | kWh | dV/dt | dT | kWh | dV/dt | dT |
| *1 | 1 | 2 | 0,00 | 4 | 0,00 | 6 | 0,00 | 0,00 | 8 | 0,00 | 0,00 | 10 | 0,00 | 0,00 |
| | 2 | 4 | 0,45 | 8 | 1,49 | 12 | 112,30 | 3,09 | 16 | 88,50 | 5,22 | 20 | 73,20 | 7,89 |
| | 3 | 6 | 0,58 | 12 | 1,81 | ● 18 | 95,90 | ● 3,61 | 24 | 77,30 | 5,98 | 30 | 65,00 | 8,88 |
| | 4 | 8 | 0,69 | ● 16 | 2,08 | 24 | 85,10 | 4,07 | 32 | 69,60 | 6,64 | 40 | 59,20 | 9,76 |
| | 5 | 10 | 0,79 | 20 | 2,33 | 30 | 77,20 | 4,49 | 40 | 63,80 | 7,24 | 50 | 54,70 | 10,56 |
| | 6 | 12 | 0,89 | 24 | 2,56 | ● 36 | 71,10 | ● 4,87 | 48 | 59,20 | 7,80 | 60 | 51,10 | 11,30 |
| | 7 | 14 | 0,98 | 28 | 2,77 | 42 | 66,20 | 5,23 | 56 | 55,50 | 8,32 | 70 | 48,10 | 12,01 |
| | 8 | ● 16 | 1,06 | ● 32 | 2,98 | 48 | 62,10 | 5,58 | 64 | 52,30 | 8,83 | 80 | 45,50 | 12,69 |
| | 9 | ● 18 | 1,15 | ● 36 | 3,17 | 54 | 58,60 | 5,91 | 72 | 49,60 | 9,31 | 90 | 43,30 | 13,34 |
| | 10 | 20 | 1,23 | 40 | 3,37 | 60 | 55,60 | 6,23 | 80 | 47,20 | 9,79 | 100 | 41,40 | 13,95 |

FIG. 12B

*1 NUMBER OF MODULES IN PARALLEL

| A = 15°C |
| --- |
| B = 14.64°C |
| C = 14.28°C |
| D = 13.92°C |
| E = 13.56°C |
| F = 13.2°C |
| G = 12.84°C |
| H = 12.48°C |
| I = 12.12°C |
| J = 11.76°C |
| K = 11.4°C |

BATTERY MANAGEMENT SYSTEM

CROSS-REFERENCE TO RELATED APPLICATIONS

This application is a 371 National Stage Application of PCT/EP2010/002522, filed Apr. 23, 2010, the entirety of which is incorporated by reference herein.

BACKGROUND OF THE INVENTION

The present invention relates to a battery management system for a battery module comprising a plurality of cells connected to one another which each have a positive and a negative terminal. The invention is in particular concerned with a battery management system which is used with accumulators especially lithium ion cells for forming a traction battery or a traction battery module for vehicles with an electrical drive drain. Such battery modules can for example be used in electrical vehicles, hybrid vehicles with combustion engines or hybrid vehicles with fuel cells, can however also be used for other purposes, for example for stationary applications or for small traction applications, such as for example in a wheelchair.

The battery management system in accordance with the invention is preferably used with battery modules which are based on lithium ion cells, however, any other available rechargeable battery cell can in principle also be used.

A battery module system, which can for example be built up from a plurality of like battery modules, can for example be designed to cover a power range with an energy content between 1 kWh and 400 kWh or more and can straightforwardly operate in a voltage range between 12 and 800 V. A battery module can for example be designed with twelve individual cells each having a cell voltage of 3.6 V and a capacity of 40 Ah in order to build up a battery module having a total energy content of 1.728 kWh which, depending on the interconnection of the individual cells, has output voltages in the range from 10.8 V to 43.2 V with capacity extraction in the range between 160 Ah and 40 Ah. By way of example with a 3s4p connection, i.e. with four respective cells connected in parallel which are connected three times in series after one another an output voltage of 10.8 V (3×3.6 V) can be generated and a battery module of this kind then enables a capacity extraction of up to 160 Ah. With the configuration of 12s1p, i.e. with twelve cells in series, an output voltage of 43.2 V can be achieved (12×3.6 V) and a current extraction of 40 A for one hour is possible. In general the notation: XsYp has to be understood in such a way that X recites the number of cells in series and Y the number of cells in parallel. Through the circuit variants the possibility also exists of obtaining different module voltages with the same module size and the same basic construction.

In order to achieve higher voltages a corresponding number of battery modules can be connected electrically in series, the connection of the individual battery modules to one another can also take place in accordance with the pattern XsYp.

A reference system for use in electrical battery compact vehicles can for example be orientated on the following key data: total energy content of modules 13.824 kWh (i.e. eight battery modules each having 1.732 kWh), voltage level 400 V and continuous power±20 kW. In this connection it should be noted that for the generation of a voltage level of 400 V it can be necessary to step up the total output voltage of the battery with the aid of an inverter and/or a transformer. For example when using eight battery modules of the above-named kind in a 6s2p configuration with 21.6 V output voltage per battery module, a total output voltage with a series circuit of all eight battery modules of 8×21.6 V=172.38 V is achieved.

Even though a battery module of this kind may be designed for a continuous power of ±20 kW nevertheless peak powers of for example 100 kW can be demanded in short term from the battery for example for acceleration purposes, whereby excellent acceleration values can be achieved. Furthermore, charging can be operated with a charging power of for example 40 kW.

The above quoted values are simply named as an example, but on the other hand represent values which can entirely be achieved with commercially available lithium ion batteries.

Basically the technology of the battery design which appears most suitable in accordance with the criteria of the technical potential can be used at the cell level, such as for example energy and power density, reliability and working life, cost potential and resource availability. At the system level or module level the reliability, the long working life and comfort in operation must also be taken into account. Furthermore, the additional measures which are required to achieve a functioning battery system should involve a minimum of additional cost, weight and volume. Such additional measures relate for example to the electrical management of the battery module, to the thermal management of the battery module, to the integration at the cell level and module level and also to the integration into a vehicle.

In order to guarantee a long working life of the battery cells and in order to ensure that the individual charging and discharging rates of the battery cells do not exceed of fall short of preset values it is known to provide battery management systems for the operation with the battery modules.

In order to carry out a check of the individual battery cells in operation the cell voltages are regularly measured and if necessary investigated for possible faults. Should a fault be detected then a corresponding indication is sent by the battery management system to the user and/or to an evaluation device and in the worst case the battery module is brought into a safe condition.

Since a vehicle is as a rule not permanently in operation, the battery management system is normally placed in a rest state when the vehicle is switched off, and the system is regularly started again briefly after a period of time in order to ensure with long periods of non-use that individual battery cells do not drop below a preset minimum voltage and in order to then place all the cells in the same state of charge.

The invention is based on the object of making available an improved battery management system which is of compact construction, operates very reliably and is relatively simple, and which makes it possible to evaluate the thermal and electrical parameters of the individual battery cells.

In order to satisfy this object a battery management system is provided for a battery module having a plurality of battery cells which each have positive and negative terminals. The battery management system is arranged on a circuit board which has a plurality of electrical contacts which can be brought in direct contact with conductive elements of the battery cells. The conducting elements are formed by the terminals of the battery cells of the battery module and/or by conducting space elements which are provided between adjacent terminals of the cells.

The invention takes into account that the terminals of individual battery cells of the battery module are electrically and thermally conducting and that spacer elements are preferably arranged in accordance with the invention between adjacent terminals of the cells. Since the circuit board of the battery management system can now brought into direct contact with the conducting elements of the battery cells the cabling between the individual battery cells and the battery management system which is otherwise required and which represents a source of faults is omitted. This has the consequence that not only sources of faults during the installation and operation of the battery management system in the vehicle are avoided but rather the assembly of the battery module is simplified. Moreover, corrosion at cable terminals is largely avoided since these are no longer present.

Since the battery management system now stands without cabling in direct contact with the individual battery cells of the battery module the function of the individual battery cells can be better monitored and controlled in a battery module. More precisely it is stated that the measured temperature and/or voltages of the individual battery cells can be more precisely determined and preferably also controlled.

The more precisely measured measurement values now mean that faults in the individual battery cells can now be more rapidly detected and/or more precise statements concerning the state of charge of the battery cells can be made, so that the battery management system if required can send a corresponding communication to the driver and/or to the evaluation device so that the driver is advised at an early stage when he has to drive to a charging station or an electrical socket or travel to a repair workshop.

In accordance with a preferred embodiment the terminals and/or the conducting spacer elements are arranged at one side of the battery module and form a contact plane in which the circuit board has electrical and/or thermal contact to the terminals or to the spacer elements.

This construction makes it possible to connect the circuit board directly to the conducting elements and optionally to screw it into place or to attach it with a suitable preload at the conducting elements.

It is particularly favorable when the housing of the battery module has a connection position for a battery management system which is preferably provided at the same side of the housing as the terminals of the battery cells. On installation of the battery module into a vehicle, the connection of the battery management system can now take place from one side of the battery which leads, on changing of the battery module and of the battery management system, to a simplified installation or removal, which not only results in a saving of time, but rather so simplifies the installation or removal that a mechanic can simply exchange a battery management system or a battery module as a module.

At the positions at which an electrical or thermal contact in the contact plane takes place one can directly measure the voltages and temperatures of the individual battery cells which favors the measurement accuracy.

In accordance with a further embodiment, the battery management system includes at least one interface, a processor, a flash memory, an analog/digital converter (ADC) and a power supply, with at least one of the interfaces preferably being an automotive interface.

It is particularly favorable when the battery management system has a processor which is able to process the ingoing and outgoing data of the battery management system. The processor can store this data in the flash memory and compare it with data which is stored on the flash memory. The measured data are as a rule analog data points which be digitalized for the more rapid calculation of the individual values by means of an analog/digital converter ADC. The measurement points can however also be directly detected in digital form. The values that are detected can be transferred by the interface to further devices in the vehicle. Since the battery management system has a separate power supply, the battery management system can also be used in vehicles which have not been used for a longer time interval, because the separate power supply ensures that the battery management system can also be used with a switched off battery module and the stored data of the battery management system is not lost and that the battery management system does not additionally discharge the battery cell which under some circumstances are empty, which would make the battery cell unusable.

Simple customary interface plugs or bus connectors can be used for the battery management system and the interface can be a CAN, LIN, RS485, uBus or any other kind of interface which can be used for the transmission of data.

In accordance with a further embodiment the battery management system is designed to measure voltage differences and/or a value proportional thereto at different points at the battery cell and optionally to store the measured voltages at least temporarily.

A potential difference between the positive and the negative terminals of a battery cell is preferably measured in order to obtain a pronouncement of the instantaneous state of charge of a battery cell. Since the voltage differences or voltages are at least temporarily stored, discharging rates and charging rates of the individual battery cells can be determined. This is above all useful when the charging rates or discharging rates for the individual battery cells set by the battery management system are exceeded or fallen short off because the battery management system can now transmit a warning or fault indication to the driver or to an evaluation device.

In accordance with a further embodiment the battery management system is designed to monitor the measured voltages of the battery cells.

The battery charging or discharging rates of individual battery cells can be stored in a memory and can periodically compared with one another. This is above all expedient than the charging or discharging cycles of the individual battery cells change with increasing working life because the battery management system can now estimate the remaining working life of the individual battery cells with respect to the stored characteristics and can if necessary transmit a warning signal or a fault signal to the driver or to an evaluation device give effect that the battery module change as expected.

In accordance with a further embodiment the battery management system is designed to monitor a charging process of the battery module with reference to the measured voltages of the battery cells and if necessary to regulate individually for each cell by changing resistances associated with the battery cells.

If the preset discharging and/or charging rates of the battery cells are fallen short of or exceeded, then the battery management system can regulate the charging procedure and/or the discharging procedure with reference to the resistances associated with the battery cells. Individual circuits can also be associated with the individual batteries which are for example able to change a current flow to the individual battery cells by transistors and/or diodes and thus to regulate it.

In accordance with a further embodiment the battery management system is designed in order to store temperatures measured at at least one point in the battery module if necessary at least temporarily.

The individual battery cells of a battery module are preferably operated and stored at temperatures in the range from 5° C. up to 30° C. The working life of the individual battery cells can also drop significantly when the temperatures of the battery cells exceed or fall short of these values. By at least temporarily storing the measured temperatures a heating and/or cooling rate of the battery module can be determined. This is above all useful when heating rates and/or cooling rates of the individual battery cells preset by the battery management system are fallen short of or exceeded in order to change these by suitable counter-measures.

In accordance with a further embodiment the battery management system is designed to monitor the measured temperatures. Since the battery management system monitors the measured temperatures it can also be ensured that, for example after a warming up phase of the battery cells these do not overheated and/or that the battery cells do not cool down too much and be correspondingly damaged as a result of low outer temperatures.

In accordance with a further embodiment the circuit board has heating resistors associated with the battery cells which serve to heat up battery cells and which preferably directly contact the conducting elements, i.e. the terminals of the battery cells or the conducting spacer elements.

The battery cells are preferably stored and/or operated at at least 5° C. Should the outer temperature be less than 5° C. and the battery cells not be in operation, then these can be heated via suitable heating resistances with a resistive heating system which is arranged at the terminals of the battery cells, with for example 1 Watt/h even with arctic temperatures and can thus be reliably operated.

In accordance with a further embodiment, the battery management system is designed to initiate a heating procedure when a temperature measured at a point of the battery cell amounts to less than 5° C. and/or the battery management system is then designed to initiate a cooling procedure when the measured temperature amounts to more than 30° C.

Should the temperatures exceed or fall short off certain values, then the battery management system can initiate a heating process and/or a cooling process via the cooling circuit. Typically the battery modules are surrounded by a cooling circuit which can cool the temperatures of the battery cell down to less than 30° C. and preferably cools them to a temperature between 5° C. and 30° C., in order to ensure that the battery cells do not suffer any long term damage because they were operated or stored at too high a temperature or too low a temperature. The coolant circuit is as a rule coupled to a heat exchanger and can also be used as a heating circuit. A heating system can also be provided in the circuit guiding the coolant which heats the coolant and hereby ensures the desired minimum temperature. The heating procedure can however also take place through the resistance heating which is arranged on the circuit board.

In accordance with a further embodiment, circuits are arranged on the circuit board for the monitoring of the temperatures and/or voltages. This makes it possible to measure as close as possible to the individual temperature measurement points or voltage measurement points, which has the consequence that the measured measurement values can be more accurately detected.

In accordance with a further embodiment, the individual circuits are arranged between the said contacts of the individual battery cells of the circuit board, in particular in the region of the circuit board between the terminals and/or between the conducting spacer elements of the battery cells. This makes it possible to obtain relatively short conductive tracks between the individual components and hereby reduces the influence of external sources of faults or scatter fields on the measured temperatures and voltages which would reduce the measurement accuracy.

In accordance with a further embodiment, the circuits are arranged in the area of the contact plane on the circuit board. This not only leads to compact assemblies which simplify the exchange of the battery module and/or battery management system if required, since the operator has more space available for the installation or removal.

In accordance with a further embodiment a signal processing device is arranged on the circuit board which is designed to convert the measured or monitored temperatures and/or voltages into digital signals which are evaluated in an evaluation unit. Through the analog/digital conversion it is avoided that the analog signal are distorted and that imprecise measured values are thereby supplied.

In accordance with a further embodiment, the signal processing device is designed to modulate the digital signals onto an output voltage of the battery cells and/or onto a output voltage of the battery module which is made available by connection lines of the battery module, whereby these digital signals from an evaluation unit can be detected via the detection cable of the battery module and optionally at least temporarily stored, with the evaluation unit preferably being decoupled from the circuit board. This could replace an interface of the battery management system, since now only the power cable of the individual battery module has to be used in order to transmit the measured signal to the evaluation unit, which simplifies the installation and removal of the battery module and/or of the battery management system and also minimizes the cabling complexity.

In accordance with a further embodiment contact between the battery management system and the battery module is produced by screws and/or spring contacts. This signifies that no solder joints are required in order to make a connection of the circuit board with the terminals of the battery cells or with the spacer elements between the terminals of the battery cells. This has the advantage that no cold solder joints can arise which could cause reliability problems in the battery management system.

In a further aspect of the invention a battery module unit is provided which consists of a combination of the battery management system of the invention and the battery module of the initially named kind which is characterized in that the terminals which are of areal design and provided with cutouts are arranged in at least two rows such that the broad sides of adjacent areal terminals of a respective row confront one another, in that the terminals of each row are held at a spacing from one another by systematically disposed conductive spacer elements and, if necessary, by insulating spacer elements, in that the cells are connected electrically in series and/or parallel to one another within the module by systematic arrangement of that positive and negative terminals in the one or other row and in that the terminals of each row and also the spacer elements arranged there between are pressed against one another by a clamping device.

A mechanical layout of the battery module of this kind makes it possible first of all, depending on the systematic arrangement of the positive and negative terminals of the cells within the module, to achieve different operating voltages and operating currents with a basically similar design of the battery module, so that most components can be used in the different variants and few special parts required, if at all, which would otherwise increase the manufacturing costs. It is also basically possible to select the number of the cells per battery module flexibly and nevertheless to use many common components in the manufacture of the respective battery modules. The battery size can be scaled by the modular concept and the electrical and hydraulic connection possibilities in wide ranges. The design principles can be rapidly and simply adapted with changed cell geometry or performance data to other flat cells.

The battery module unit in accordance with the invention can thus be flexibly designed and itself quasi has a modular construction.

Through the use of areal terminals it is possible, on the one hand, to make the individual cells, which are preferably of parallelepiped shape in plan view, relatively flat, whereby heat can be dissipated from the individual cells via the areal terminals. Through the flat parallelepiped shape of the cells which results through this heat can also be readily transferred away from the flat sides of the cell, whereby a precondition can be provided for attaining a tight temperature operating range in the cell. Since the terminals of each row can be pressed against one another by a respective clamping device or against spacer elements arranged therebetween, it can be ensured that resistance losses at the different terminals do not arise or only arise to a small degree and that the battery module always has the desired output voltage over the entire working life of the battery module corresponding to the respective state of charge, because constant circumstances prevail and changing ohmic losses are not to be expected.

It is particularly favorable when the areal terminals are formed by extensions of the electrodes of the cells and are designed for intentional heat dissipation from the cells for the active cooling of the cells and can be connected to a heat dissipating cooling device. In this way the leading away of heat from the interior of the cell is favored.

BRIEF DESCRIPTION OF THE DRAWINGS

The invention will be explained in more detail in the following with reference to embodiments and to the drawing in which are shown:

FIG. 7B is a section drawing of the pressed inner side of the cooling plate of FIG. 7A at the section plane VIIB-VIIB of FIG. 7D, FIG. 7C is an enlarged representation of the encircled region of the FIG. 7B, FIG. 7D is a plan view of the pressed inner plate of FIG. 7A and FIG. 7E is a perspective representation of the pressed internal side part of the cooling plate 18 of FIG. 7A to a smaller scale, FIG. 12A, 12B are two tables for further explaining a cooling system.

DETAILED DESCRIPTION

Figure 1:
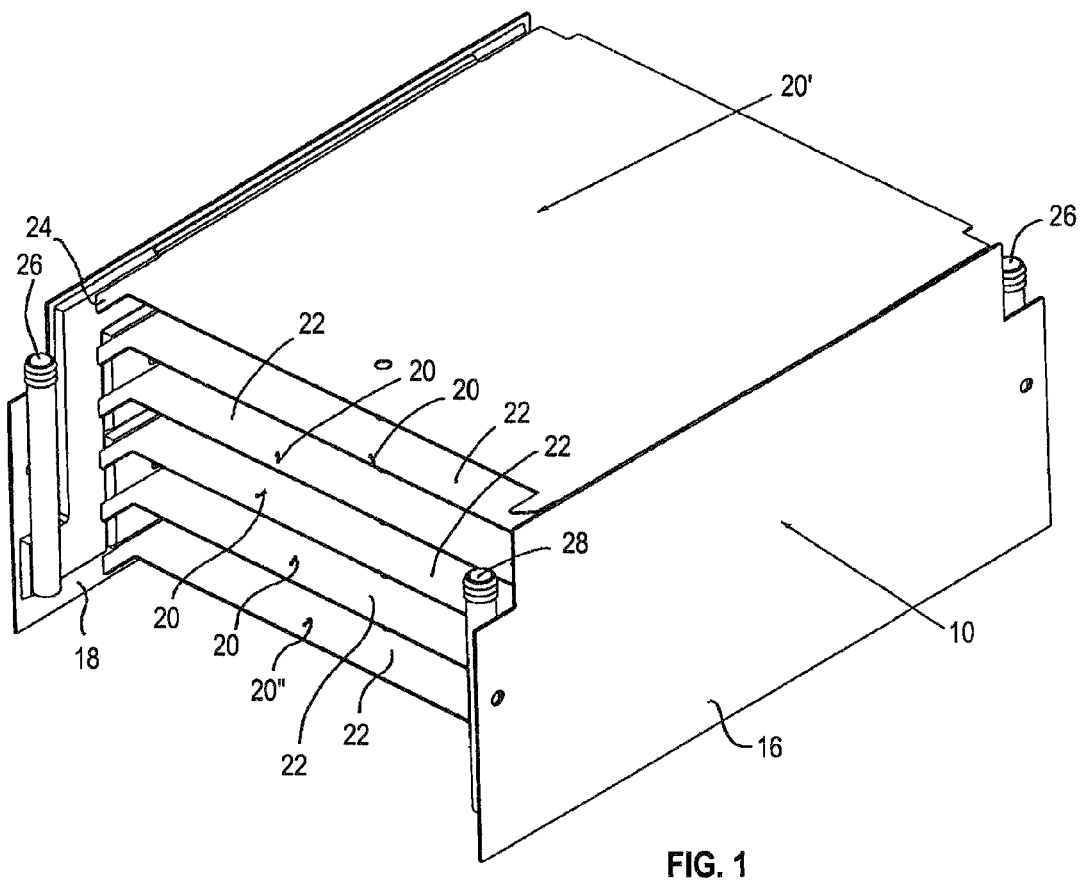
FIG. 1 is a perspective representation of a cooling module
Figure 2A:
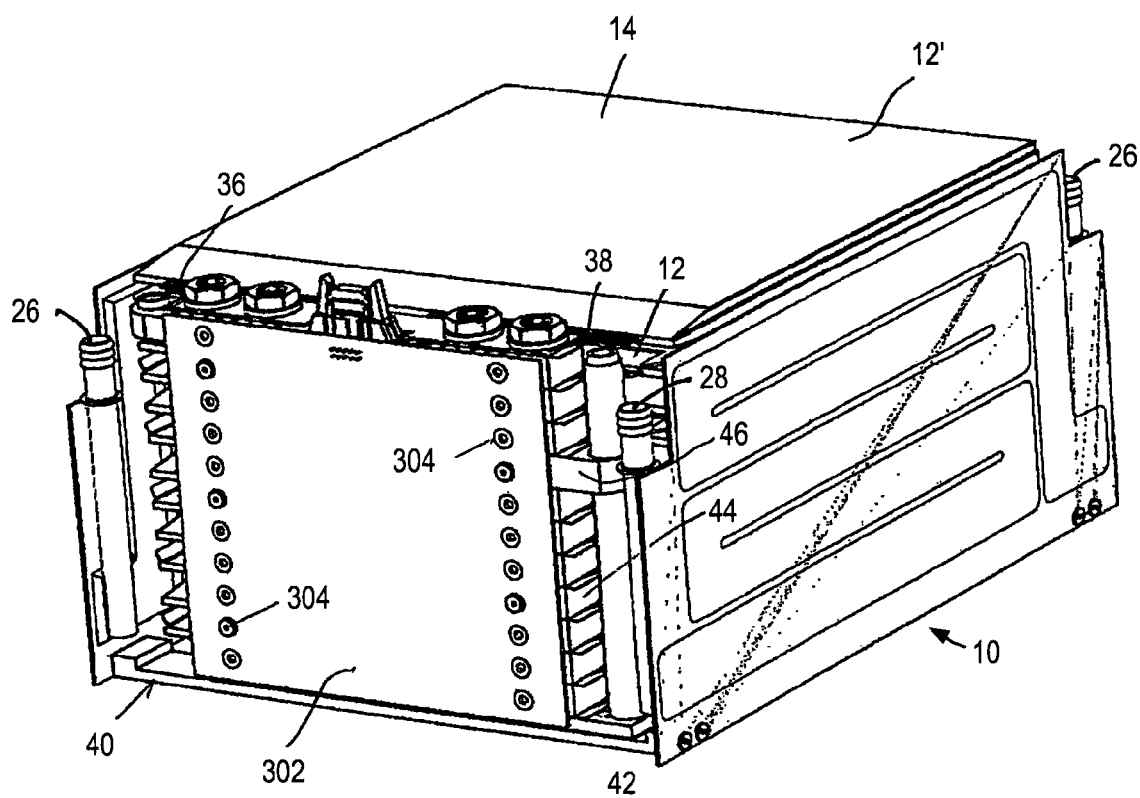
FIG. 2A is a perspective representation of the front side of the cooling module of FIG. 1 with inserted lithium ion cells and also a front plate, i.e. the front side of the battery module without a housing.
Figure 2B:
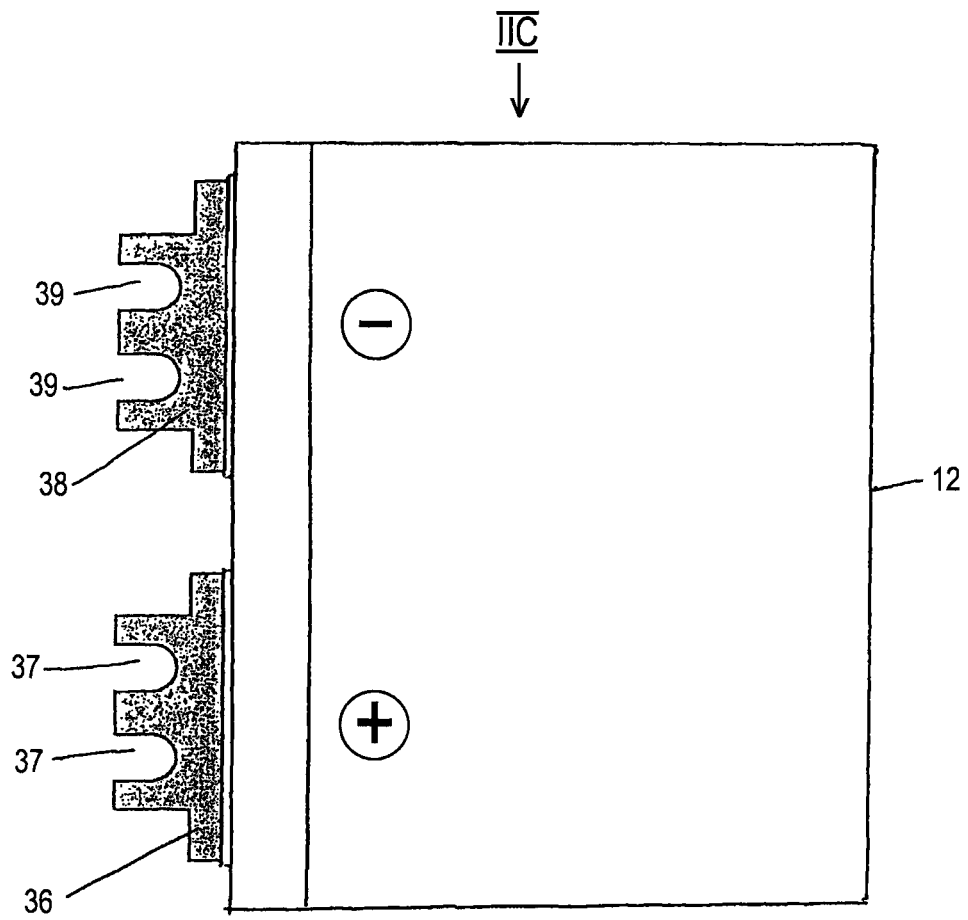
FIG. 2B is a plan view of a cell which is used in the embodiment of FIG. 2A.
Figure 2C:
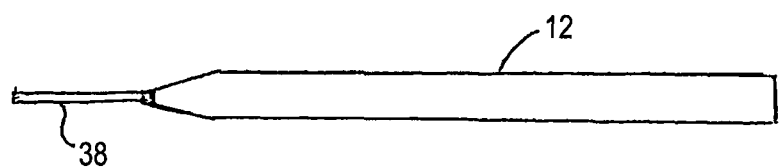
FIG. 2C is a side view of the cell of FIG. 2B corresponding to the arrow IIC of FIG. 2B.

Referring first of all to FIGS. 1 and 2 a cooling module 10 is shown in a perspective illustration which is used in the following manner which will be explained in more detail for the heat dissipation from the individual cells 12 of the battery module 14. The cooling module 10 has cooling plates at the first and second oppositely disposed sides of the module and is furthermore provided with heat conducting connection plates 20 in sheet metal form which extend between these sides and which between them form compartments 22 to receive the cells 12. The connection plates 20 have side parts 24 bent at a right angle which are adhesively bonded over their full area to the cooling plates 16, 18 or welded onto the latter or soldered onto the latter in order to ensure a high quality thermal transfer between the connector plates 20 and the cooling plates 16, 18.

It has been found that a connection plate of aluminum or an aluminum alloy having a thickness of about 1 mm is fully sufficient in order to achieve an adequate heat dissipation and an adequately uniform temperature of the individual cells.

Figure 9:
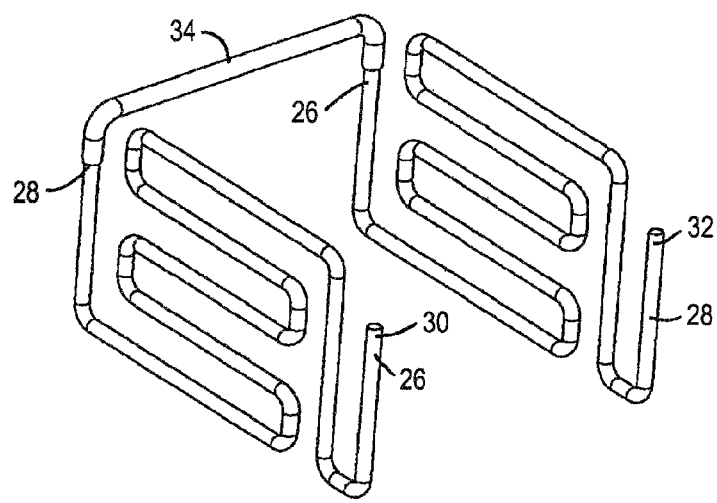
FIG. 9 is a perspective illustration of an alternative embodiment of the cooling plates of FIG. 7A through the use of one or more meandering bent pipes instead of a sheet metal construction.

Each cooling plate 16 and 18 respectively has a respective tubular inlet 26 and a tubular outlet 28 for a liquid coolant, which—for example as shown in FIG. 9—can flow through a snake-like coolant passage in each cooling plate 16, 18 from its inlet 26 to its outlet 28. In this connection the tubular inlets and outlets 26, 28 can for example be welded, soldered or adhesively bonded at the suitable points to the cooling plates 16, 18 and communicate with the respective snake-like passage. The tubular inlets and outlets 26, 28 are provided with a hose connection gland 30 and 32 respectively so that flexible hoses can be attached in liquid-tight manner to the hose connection glands.

In connection line 34 not shown in FIG. 1 but in FIG. 9 can connect the outlet of the left-hand cooling plate 18 (outlet in FIG. 1 not visible) to the input 26 of the right-hand cooling plate 16. As can in particular be seen from FIG. 2A the individual cells 12 are preferably used pair-wise in compartments of the cooling module and in addition one cell 12' is provided on the top side of the upper connecting plate 20' in FIG. 1 and a further cell (not visible) is arranged beneath the lowermost connecting plate 20" in FIG. 1. Since, in this example, five compartments 22 are formed by means of six individual connection plates 20 which each accommodate two cells and since two further cells are arranged on the outer side of the outer connection plates 20', 20" the battery module 14 of FIG. 2A includes twelve individual cells 12. Naturally the number of the individual cells can be increased, for example to fourteen or more, by using further connection plates 20 and the corresponding formation of further compartments 22 accommodating the cells 12. Nevertheless the use of twelve cells 12 for each battery module 14 seems to be a particularly favorable design. In front of the battery modules in FIG. 2A there is a circuit board 302 of the battery management system which controls the charging and discharging of the battery cells in a manner known per se. The circuit board 302 is connected to the module with screws 304 which engage into the spacer elements 44 and 46 respectively. A circuit board 302 of the battery management system, which controls the charging and the discharging of the battery cells in manner known per se, is located in front of the battery cells in FIG. 2A. The circuit board 302 is secured to the module by screws 304 which engage in the spacer elements 44 and/or 46.

The design of the cooling module can also be selected such that only one cell 12 is accommodated in each compartment. To increase the heat transfer from the cells to the connection plates (and optionally vice versa) a heat conducting paste (conductive paste), a defined contact pressure or an adhesive can be provided between the cells and the connection plates.

Figure 3A:
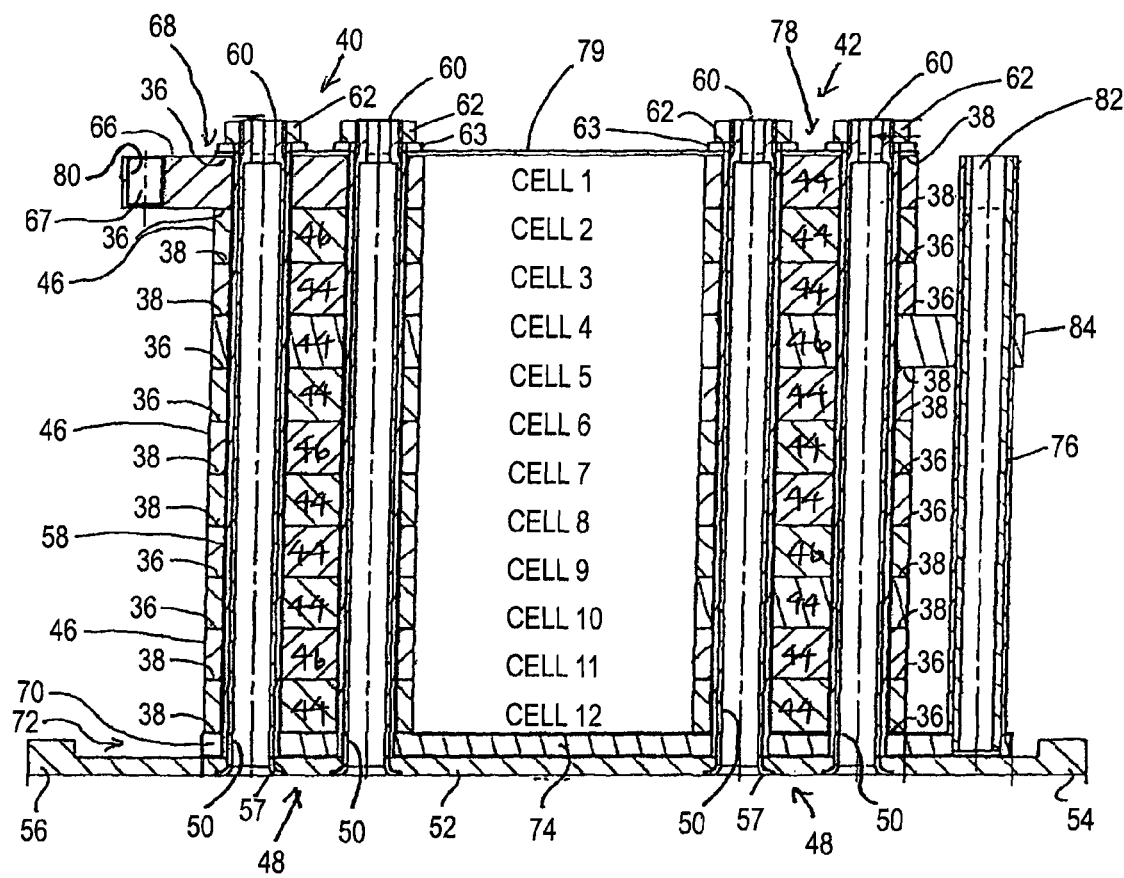
FIG. 3A is a front view of the battery module of FIG. 2 with the said front plate removed with only the terminals of the cell being visible.
Figure 3B:
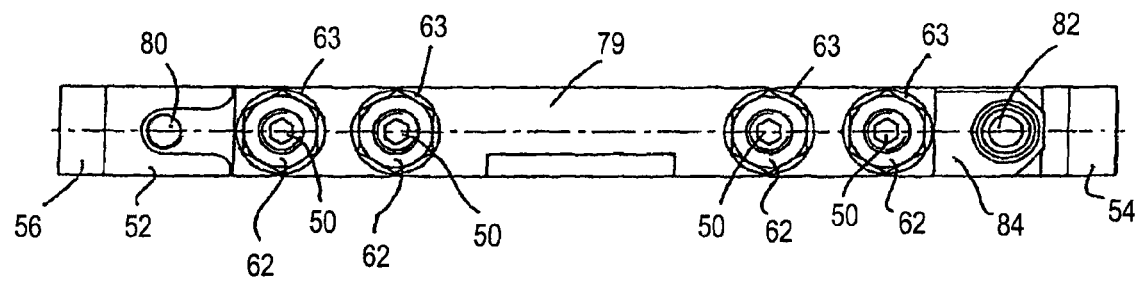
FIG. 3B is a view from above on the representation of FIG. 3A.

Each cell 12 has in this example a positive and a negative terminal 36 and 38 respectively with the positive and negative terminals 36, 38 in particular being visible in the form of black horizontal lines in FIGS. 2 and 3. They are arranged in two rows, a left-hand row 40 and a right-hand row 42 and in this example both rows are arranged at the same (front) side of the battery module 14. This is however not essential, the one row could for example be arranged at the front side of the battery module and the row at the rear side of the battery module. As can be seen particularly from FIG. 3A the broad sides of adjacent areal terminals 36, 38 of a respective row 40, 42 are arranged facing one another. From FIG. 3A it can be seen that the terminals 36, 38 of each row 40, 42 are held spaced from one another by systematically arranged contacting spacers 44 and insulating spacer 46. As can in particular also be seen from FIGS. 5 and 6 and as will be explained somewhat later in more detail the cells 12 are connected pair-wise electrically in parallel to one another and the six so formed cell pairs are connected thereto in series by systematic arrangement of their positive and negative terminals 36, 38 in the one or other row 40, 42. In this connection the terminal arrangement of FIG. 3A can be relatively easily recognized in FIG. 5 and one can then better see the precise connection of the cells from FIG. 6 which can relatively easily be brought into agreement with FIG. 5.

Figures 3C, 4:
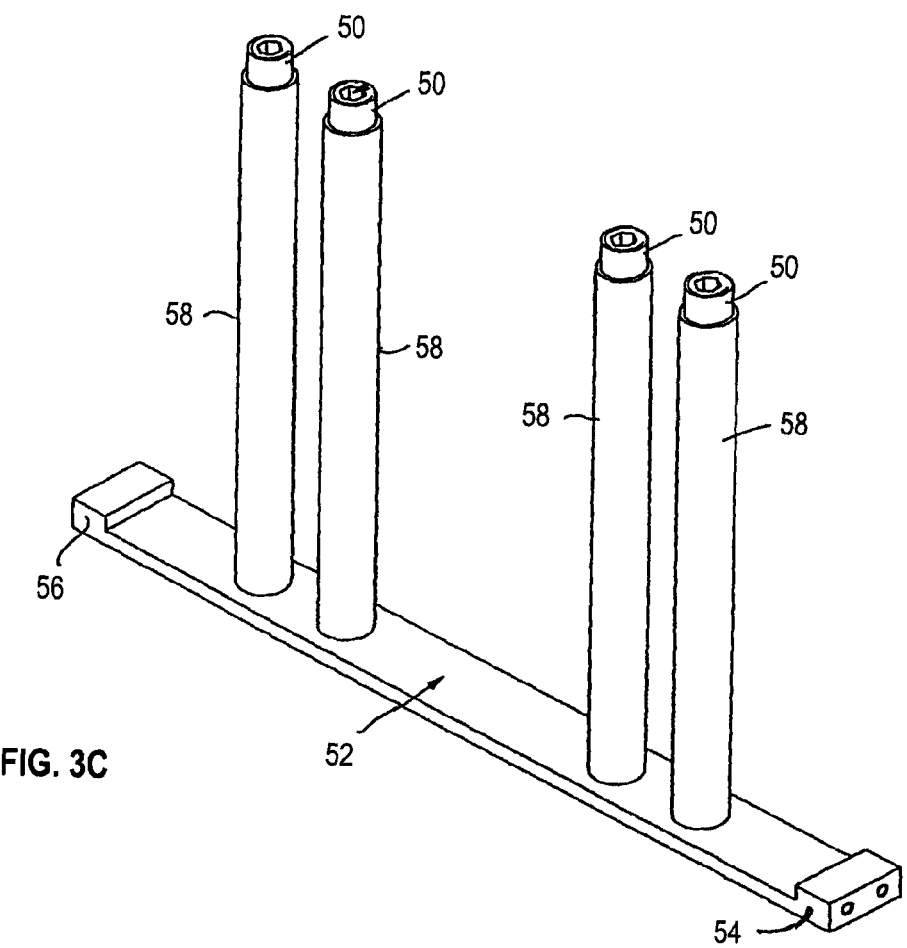
FIG. 3C is a perspective representation of a base plate of the battery modules of FIGS. 2 and 3 with the clamping bolt being shown.
FIG. 4 is a representation of some possible electrical configurations of a traction battery module including the 6s2p configuration which is used in the battery module in accordance with FIGS. 2 and 3.
Figure 5:
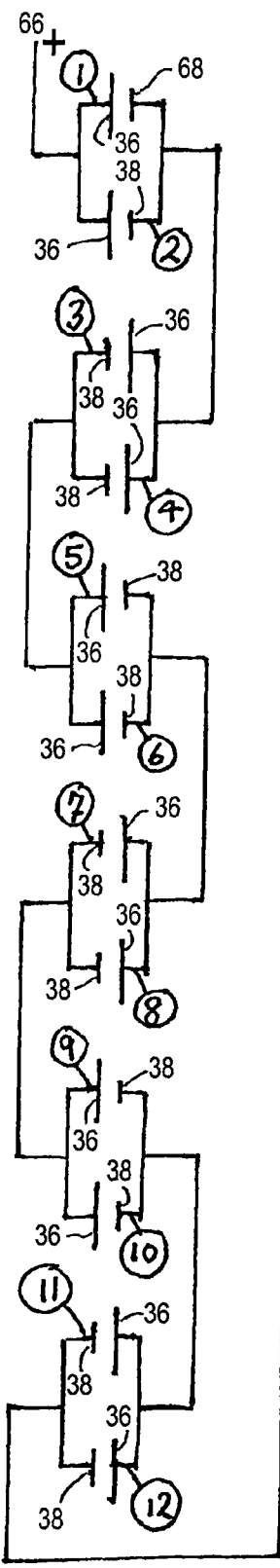
FIG. 5 is a second schematics representation of the connection of the battery module of FIG. 3A corresponding to the 6s2p configuration of FIG. 4.
Figure 6:
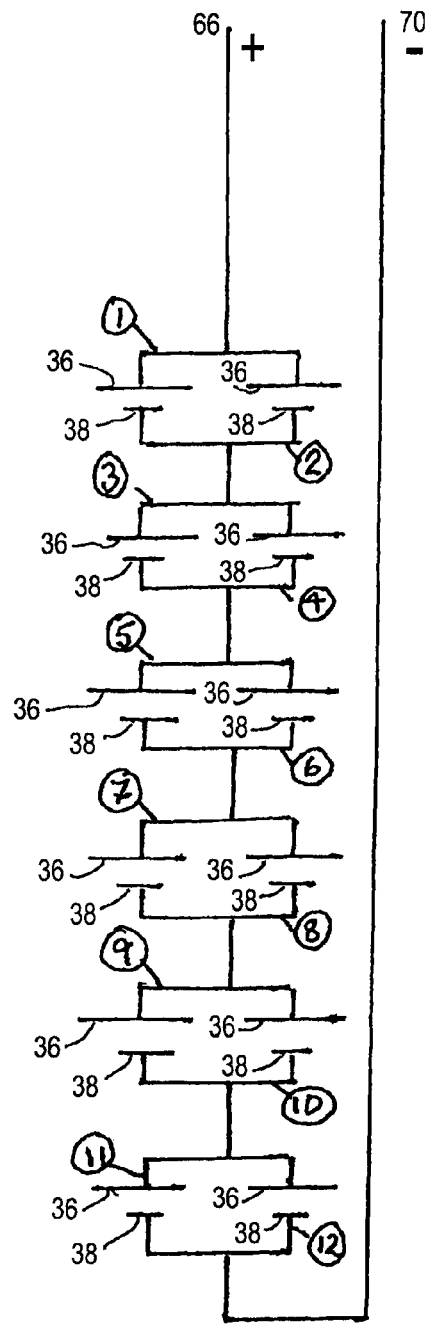
FIG. 6 is a further schematic illustration which makes it easier to bring the circuit plan in accordance with FIG. 5 into agreement with the representation of the battery module in accordance with FIG. 3A, FIGS. 7A-7E are drawings which show the construction of the cooling plate of FIG. 1 more precisely, with FIG. 7A being a perspective representation of the cooling plate of the cooling module of FIG. 1 with the inlet and outlet tubes not yet having been attached.

The arrangement of the cells shown in FIGS. 3A, 5 and 6 corresponds to the 6s2p variant of FIG. 4. The other variants of FIG. 4, i.e. the 12s1p, 4s3p and 3s4p variants can be realized by corresponding arrangement of the terminals 36 and 38 in the two rows 40 and 42, with corresponding positioning of conducting and insulating spacer elements 44, 46, and indeed using the same parts as in the embodiment of FIG. 3A. Many degrees of freedom arise through the flexible modular construction.

The terminals 36, 28 of each row and also the spacer elements arranged therebetween are pressed against one another by a clamping device 48.

The clamping device 48 for each row is formed by at least one clamping bolt 50, preferably by two or three such clamping bolts 50 (as shown in FIG. 3A). The heat conducting plate 52 (or base plate) is conductingly bolted here at its two ends 54, 56 to the respective right-hand and left-hand cooling plates 16, 18.

Each clamping bolt 50 is connected in this example by a rivet connection 57 in the form of a beaded-over joint to the heat-conducting base plate 52. Instead of this, an adhesive connection, a soldered connection or a welded connection could be used. The use of a plurality of clamping bolts or bolts per pole makes it possible to increase the contact pressure and also ensures an improved distribution of the force and of the redundancy. The pole outlets 66, 70 are designed independently of the passage bores for the clamping bolts 50. They can thus be led out flexibly as required.

It is particularly favorable when the clamping bolts 50 are made of aluminum to generate a heat-conducting connection. The construction can be so selected that the clamping bolts are each designed as an aluminum tube with a very thin coating which is electrically insulating, mechanically very stable and thermally conducting as well as possible (instead of providing a separate insulating sleeve which is detrimental for the heat dissipation). The use of the through going clamping bolts 50 minimizes the installation cost and complexity. Furthermore, the possibility exists for thermally connecting the clamping bolts 50 designed as tubes with a through flowing liquid coolant for cooling the terminals.

The insulation of the poles relative to the bolted connection and the base plate can for example take place via pertinax, ceramic or nomex paper.

The insulating spacer elements can furthermore consist of pertinax or ceramic.

The preferred embodiment of the spacer elements be it conductive elements or insulating elements will be explained later in more detail with reference to FIGS. 16A to 16D.

The electrical insulation of the clamping bolts formed by tubes can also take place through fiber materials or surface treatment.

In order to avoid electrical short circuits, the clamping bolts 50 are each surrounded by an insulating sleeve 58. At their upper ends 60 shown in FIG. 3 the clamping bolts are each provided with a thread onto which a respective nut 62 is screwed, with each nut 62 being arranged above a washer 63. The clamping bolts can be tightened in order to clamp the individual battery terminals 36, 38 to the spacer elements 44, 46 lying therebetween and hereby to ensure that transition resistances between the individual cell terminals 36, 38 and the conductive spacer elements 44 lying therebetween are precluded or are at least minimized. The washers 63 can be formed by individual washers or have the form of an elongate plate with two holes to receive the clamping bolts 50. As is in particular evident from FIG. 2B the cells 12 have at least essentially the shape of a flat parallelepiped with the positive and negative areal terminals 36, 38 of each cell 12 being arranged in one plane or in respective planes which is or are arranged parallel to the broad sides of the parallelepiped cell.

In order to facilitate the introduction of the cells into the battery module in accordance with FIG. 2A the terminals 36, 38 each have two U-shaped cutouts 37, 39—as is evident from FIG. 2B—which makes it possible to insert the cells 12 into the cooling module 10 from the rear and to push them forwardly so that they enter into the clamping region of the clamping bolts. It should likewise be possible to previously insert the cells 12 into the cooling module 10 from the front or from the rear and to introduce the clamping bolts 50 and the spacer elements 44, 46 from the front between the terminals 36, 38 so that the clamping bolts 50 enter into the U-shaped cutouts.

The reference numeral 66 points to the positive pole of the battery module 14 and is connected at a first end 68 of the left-hand row 40 of the terminals whereas the other, negative pole 70 is connected to the second end 72 of the left-hand row disposed opposite the said first end 68. The second pole 70 is guided via a conducting plate 74 and an extension 76 to the said first end 78 of the right-hand row adjacent to the first end 68 of the left-hand row so that electrical connections to the two poles 60 and 70 can be effected at a common side of the battery module 14. In this example both the positive pole 66 and also the negative pole 70 or the corresponding extension 76 are provided with a respective internal thread 80 and 82 respectively. This makes it possible to connect electrical connection lines (not shown) to the respective battery module 14 or to connect the respective battery module 14 to further like modules to form a battery module system. Furthermore, the internal threads 80 and 82 provided within upwardly projecting cylindrical collars (not shown) which on insertion of the battery module into an (insulating) housing on the one hand ensures the required electrical contact and, on the other hand, a seal against water entry, for example via means of an O-ring placed on the cylindrical collar which seals the housing, the cylindrical collar and the lower side of the electrical terminal.

A spacer element 46 of the right-hand row is extended to the side of the right-hand row 42 for the holding of the extension 76, i.e. is provided with a corresponding extension 84.

At this point it should briefly be mentioned that the ends of the connection plate 74 are likewise passed through by the clamping bolts 50 of the left and right-hand rows 40, 42. However, an insulating plate is inserted between the conductive connection plate 74 and the lower positive cell terminal 36 of the right-hand row because otherwise a short circuit will take place between the right and left terminals of the lowest cell 12, which is naturally not permissible. The upper ends 68 and 78 of the left and right-hand rows 40, 42 are likewise connected together with an insulating plate 79 through which the clamping bolts 50 correspondingly pass.

As indicated briefly above the cooling plates 16, 18 of the cooling module 10 arranged at the side are flowed through in operation by a liquid coolant, which preferably can be pumped in snake-like manner through corresponding passages of the plates 16, 18 and optionally through a connection line 36 between the cooling plates 16, 18.

The specific design of the cooling plates can be seen in detail from the FIGS. 7A to 7E. As FIG. 7A shows the tubular inlet of the cooling passage of the left-hand plate in this example is guided from the top to the bottom and is attached there to a lateral lug 86 of the cooling plate 16, which can for example take place by a soldered connection, a welded connection or an adhesively bonded connection. The snake-like cooling passage leads then in the example of FIG. 7A with a first vertical section 88 upwardly then with a second horizontal section 90 to the right, than via a further shorter vertical section 92 downwardly, via the fourth horizontal section 94 to the left, via a fifth vertical section 96 downwardly at the left-hand side of the cooling plate, via a sixth horizontal section 98 to the right, via a seventh vertical section 100 at the right-hand side of the cooling plate downwardly and via an eighth horizontal section 102 of the cooling passage to the left to a further vertical section 104, which subsequently leads via a further horizontal section 106 to the right to a further lug 108 to which the tubular outlet 28 is connected (here likewise with a soldered connection, a welded connection or an adhesively bonded connection).

The passages 86, 88, 90, 92, 94, 96, 98, 100, 102, 104 and 106 themselves are generated, as can be seen from FIG. 7B by a corresponding pressing of a sheet metal part or of a base plate 85 which leads to ribs 99 between the cooling passages 86, 88, 90, 92, 94, 96, 98, 100, 102, 104, 106, 108 and also at the top and at the bottom of the sheet metal part to which a flat sheet metal cover plate 110 can be attached, here also by means of a soldered connection or a welded connection or an adhesively bonded connection. The result, prior to the attachment of the connection tubes 26, 28, can be seen in a perspective illustration (to a smaller scale) from the FIG. 7E. The left-hand and right-hand cooling plates 6, 18 are identically designed so that only three different parts are required in order to form both cooling plates. These are the ribbed sheet metal part of FIG. 7B, the sheet metal cover part 110 and the turned tubular part which forms the inlet and outlet tubes 26, 28. All parts consists of aluminum or of an aluminum alloy.

Through the use of a tubular inlet 26 and a tubular outlet 28 the actual inlet and the actual outlet can in this way be provided at the same side of the battery module and indeed preferably at the same side as the pole connections 80 and 82, i.e. at the upper side of the battery module 14 as one can see from the specific embodiment of FIGS. 2A and 3A. It would, however, already be possible to realize the inlet and outlet connections to the snake-like cooling plate differently. For example, one can lead both of the connection tubes 26, 28 out at the top side of the cooling plate of FIG. 7A (instead of at the bottom side as shown in FIG. 7A) or can arrange the inlet tube 26 or the outlet tube 28 at the top and the respective other outlet 28 or inlet 26 at the bottom. It should be brought out that it is not absolutely essential to design the left-hand and right-hand plates 16, 18 of the cooling module 10 as directly cooled plates in the sense that liquid passages for a liquid coolant are present there, but rather it would also be conceivable to provide a rear plate of the cooling module and to correspondingly form this with cooling passages while the left-hand and right-hand plate 18, 16 of the cooling module 10 can be formed by simple sheet metal plates. The preferred arrangement is however the embodiment in accordance with FIG. 1 or FIGS. 7A to 7E and 9.

The geometry of the cooling passages in accordance with FIG. 7A can be changed so that flow takes place in parallel through the channels. Thus, lower pressure loss arises and a plurality of cooling plates or cooling modules can be connected in series. This signifies that the tubular connection and discharge tubes 26, 28 must each be attached to a plurality of cooling passages of the cooling plates which extend parallel to one another instead of to the snake-like arrangements of FIGS. 7A to 7E.

Figure 8A:
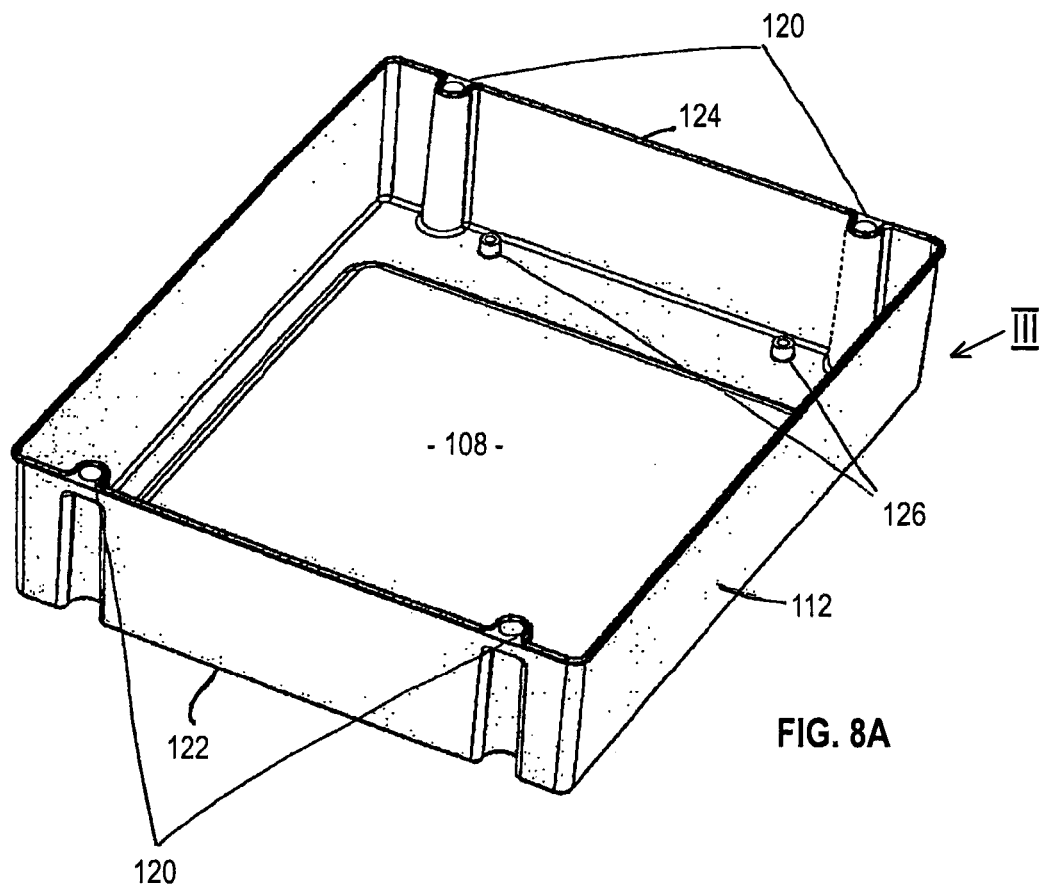
FIG. 8A is a perspective illustration from the front and from above of the lower half of the housing for the battery module of FIG. 2.
Figure 8B:
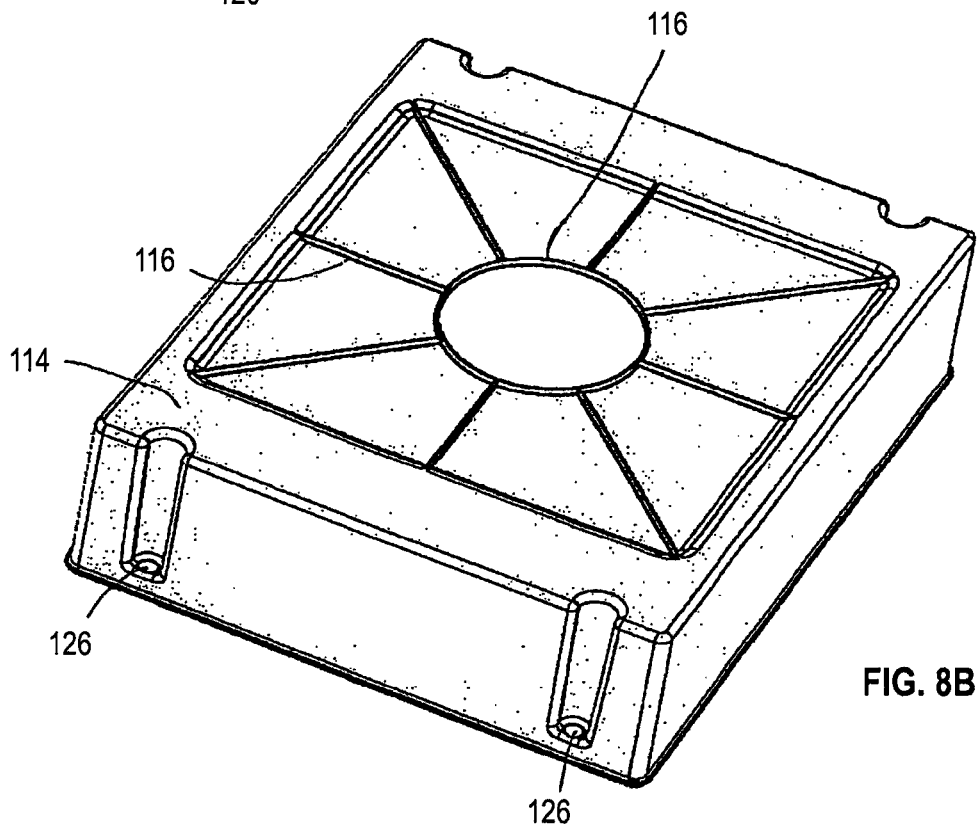
FIG. 8B is a perspective illustration on the underside of the housing half of FIG. 8A.

The cooling module 10 in accordance with FIG. 1 with the inserted cells 12 in accordance with FIGS. 2 and 3 is received in a two-part insulating housing 111 of which details can be found in FIGS. 8A to 8E. The FIG. 8A shows that a lower half 112 of the housing 111 is at least substantially of parallelepiped shape, its lower side 114 in accordance with FIG. 8B is provided with ribs 116 for stiffening. At the inner side of the lower half 2 of the housing there is located a foam material inlay 108 which biases the lowermost cell 12 against the lowermost connection plate 204 of the cooling module 10 i.e. presses it into contact there, in order to favor the transporting way of heat from this cell. One can furthermore see in FIG. 8A that in each case two threaded inserts 120 are provided at the first and second longitudinal side 122, 124 of the lower half 122 of the housing and that further threaded inserts 126 are provided at a corresponding spacing from the inner side of the base part of the lower half of the housing. These serve for the screwing on and attachment of the cooling module 10 and the battery module within the housing.

The upper half 128 of the housing is similarly designed except that here the ribbing 130 which is provided for the stiffening of the upper side of the upper half 128 of the housing 111 is provided on the inner side of the upper half of the housing. This ribbing 120 lies in the assembled state of the housing 111 with the installed battery module 14 at the upper broad side of the upper cell 12', if required via a foam material inlay and presses the upper cell 12' against the upper connection plate 20' in order to ensure a good heat transfer there also.

Figure 8C:
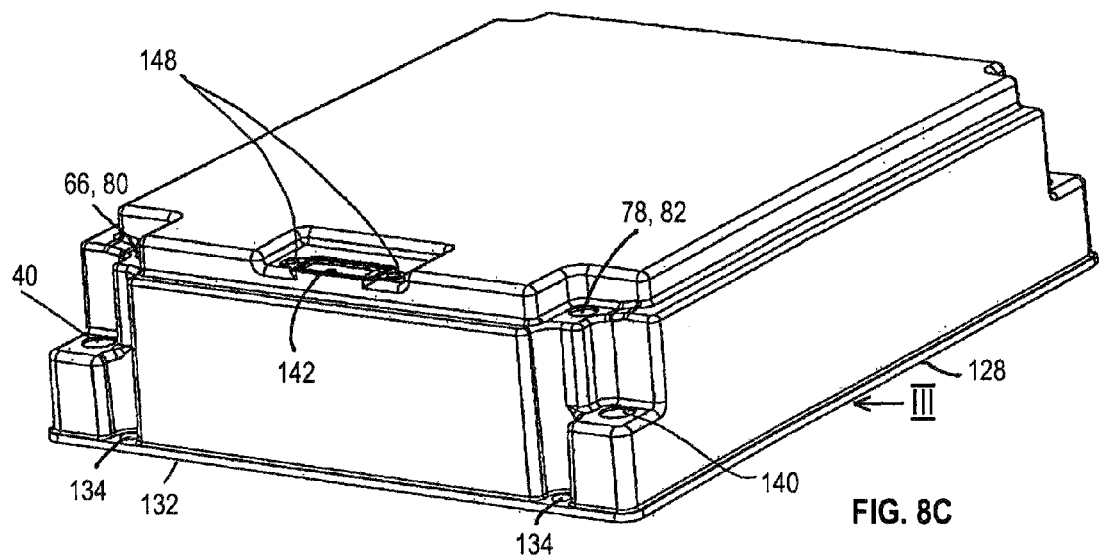
FIG. 8C is a perspective representation from the front, from the right and from above onto the upper half of the housing of the battery module.
Figure 8D:
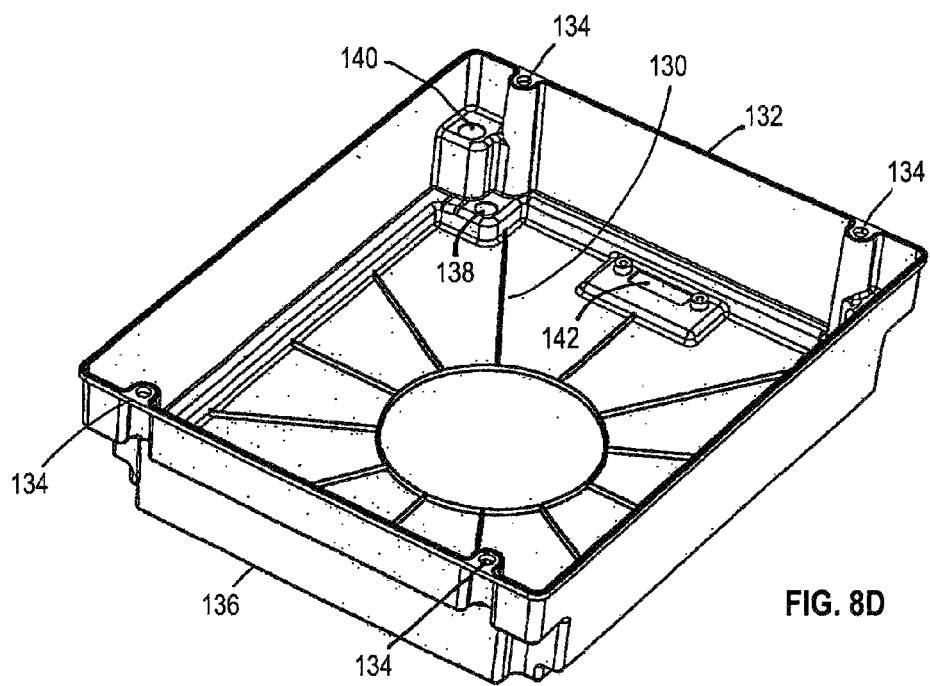
FIG. 8D is a perspective illustration of the inner side of the upper housing half of FIG. 8C but to a smaller scale.

From FIG. 8C one can see that the front longitudinal side 132 of the upper half of the housing has two bores 134 which enable screws to be inserted which engage in the corresponding threaded inserts 120 of the first longitudinal side 122 of the lower half 112 of the housing 111. Two further bores are provided at the rear longitudinal side 136 of the upper half 128 of the housing 111 in accordance with FIG. 8C but are however not evident there but rather in the illustration of FIG. 8D.

Figure 8E:
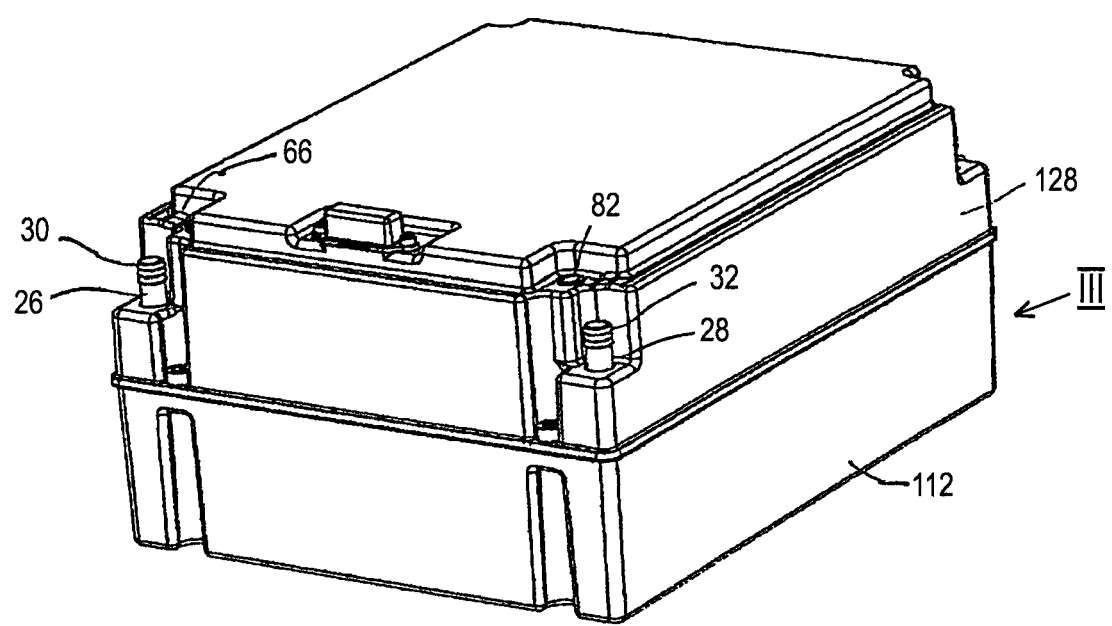
FIG. 8E is a perspective illustration from the front, from the right and from above on the housing of the finished battery module.

As can be found from the finished housing with the installed battery module in accordance with FIG. 8E the two poles 66 and 70 or the inner threads 80, 82 provided there are accessible through the bores 138 so that there the electrical connection can be effected. The electrical connection thus takes place from the upper side of the battery housing but beneath the upper side. The electrical connection cable can also be guided beneath the upper side of the housing, for example within the step which extends around the upper side, so that the electrical lines do not enlarge either the constructional height of the module or the installed height in the vehicle. The tubular inlet 26 and the tubular outlet 28 for the cooling system or the corresponding connection glands 30, 32 project through the bores 140 of the upper half of the housing. Here also the coolant connection takes place below the upper side of the battery module and it is also possible here to so guide the external connection hoses that they do not increase the constructional height of the battery module or its installed height. If required the said steps can be made larger or deeper in order to enable this.

Furthermore, the battery management system is provided with a plug which is accessible through the opening 142 at the upper side 146 of the upper half 128 of the housing 111, with the housing 111 being equipped here with two thread inserts 148 which serve to accommodate fastener bolts of the plug.

The housing is a two-part injection molded component and can have the following design: The critical dimension is the short side (constructional height 155 mm). In this connection the connections (poles, cooling and data) are executed in sunk matter. The data plug is in practice sunk still further in order to enable a seal without additional constructional space. The dimensions can for example be selected as follows:
Base dimension: ca. 300×245×155 mm
Volume: ca. 11 l
Energy density: ca. 152 Wh/l
Mass: ca. 4.15 kg
Specific energy: ca. 122 Wh/kg.

The two housing halves 112, 128 can be closed against one another with a periphery extending groove and tongue system for sealing. If required the battery management plug can be provided with a sealed cap and seals between the housing and the coolant connection tubes 26, 28.

The modules can however be integrated with or without a housing to form a battery. The system limit and the functions which are to be realized thereby such as for example sealing against contaminants from the outside, EMV and mechanical reliability can thus be flexibly placed around the module up to the complete battery. The module without the outer housing (cell stack) can for example be welded into a foil. These stacks are then installed in a number greater than 1 into a system housing.

Starting from a battery module system with eight individual battery modules 14 of the above-described kind some considerations relating to the cooling system will now be described.

Before the design of the cooling system is described in more detail it is appropriate to say some few words about the cooling of a traction battery system and for the air conditioning requirement in a vehicle which has the battery system.

A main goal of the cooling system is to ensure the operating reliability of the traction battery system with the motivation to avoid the exceeding of specific temperature limits which could otherwise lead to a permanent damage of the battery system and in an extreme case to fire or explosion. In order to achieve this, the battery system is cooled and indeed with the object of not exceeding dangerous and damaging temperature limits. For many battery technologies the temperature should not rise above 30° C. in order to obtain a maximum working life. In accordance with experience each temperature increase by 10° C. above 30° C. leads to a reduction in working life by ca. one half which is however technology-dependent.

For a traction battery system a thermal conditioning requirement also exists, for example in order to improve the cold starting behavior. This is necessary because at low temperatures the performance of the cells that are used reduces greatly. In order to counteract this the battery system must for example be heated in winter operation.

In general, in accordance with the concept, the traction battery system—which normally consists of a plurality of battery modules—and/or the individual battery modules are thermally well insulated. This prevents the battery modules or the cells contained therein cooling down rapidly with the consequence that they subsequently have to be heated up in a costly manner in order to enable the renewed starting of the vehicle.

One possibility of heating the battery cell is to use a resistance heating which directly contacts the electrically conducting spacer elements. For example a resistance heater can be provided for each conductive spacer element. Since the electrically conductive spacer elements are naturally thermally well conducting and have a high quality electrical and heat-conducting connection or transfer to the metallic lugs of the electrodes of the cells the electrically generated heat can be introduced directly into the interior of the respective cells which is particularly energy-efficient for heating up of the cells. In a well insulated arrangement an energy input of 1 Watt per cell is already sufficient. This energy can be delivered by the battery modules themselves or during the charging of the battery modules from the power supply or from an associated combustion engine, combustion heater or fuel cell system. The resistors can also be attached to a circuit board which belongs to the battery management system and is pressed against the spacer elements.

The heating up of the battery modules can also be achieved alternatively to the described electrical heating via the cooling system that is present, as well be explained in more detail below.

Furthermore, it is appropriate to thermally insulate the individual battery modules per se and/or in the assembly relative to the environment in order, on the one hand, to store the self-heat of the batteries and, on the other hand, to reduce heat losses on heating of the batteries. If for example the battery system has a temperature in operation close to 30° C. one can, by suitable insulation within the module housing and/or outside of the module housing, reduce the heat loss of the battery system so that the battery system does not cool down very rapidly and remains adequately warm in order, after a break in a journey, to be able to economically start operation again.

A temperature equilibrium between the cells of the individual battery modules 14 should also take place with the motivation of exploiting the capacity of the cells to a maximum and to make the available power a maximum over the full working life. This also requires the cooling or indeed the heating of the individual cells 12 of the battery module 14. One aims at a uniform temperature level which leads to an equivalent cell behavior and to uniform discharge and aging of the cells. In other words, through the correct temperature level and a corresponding temperature equalization, one can ensure that all cells 12 make available the maximum power over the longest possible time period and that on achieving the maximum working life all cells 12 are at the end of their respective working lives, so that an economical exchange of battery modules 14 can take place, since one does not have to prematurely exchange individual battery modules and, on failure of one battery module 14 all cells 12 are likewise at the end of their working life.

Two possibilities for the heat transfer from or to the cells 12 of an individual battery module 14 are basically conceivable. An energy exchange of the cell 12 with the environment can either take place by air cooling or by liquid cooling. With air cooling a direct contact is required between the cell housing and the environmental air but the poor thermal conductivity and the low density of the air require large volumetric flows and large exchange surfaces as well as a pronounced generation of noise.

In contrast, for liquid cooling, a better transfer of the energy can take place via heat conduction and convection from the housing 111 into a liquid coolant and following this via convection into the environmental air. With liquid cooling a better thermal conductivity can be achieved since the heat-conducting elements 16, 18, 20, 52, 46, 36, 38 stand in direct contact with the cells 12 and these, together with a heat exchanger cooling the liquid coolant permits smaller volume flows and exchange surfaces and also lower noise generation. The use of liquid cooling does however necessitate additional components in the form of hose connections and seals and also a heat exchanger to the environment.

If one decides for liquid cooling then one must simultaneously employ considerations in connection with the hydraulic design of the entire cooling system. Pressure losses arise in the tubes/hoses/cooling passages and components of the cooling system. For flow elements in the form of tubes with round cross-section and corresponding bends one can estimate these pressure losses with empirical formulae. In addition to the resistances in each cooling module the external loops and also the radiator introduce resistances into the circuit which must additionally be taken into account as soon as a design concept is present. The pump which is required for the circulation of the coolant imposes a volume flow against these resistances which is dependent on these resistances and generates a stable working point there where the pressure which can be supplied by the pump intersects the characteristic of the cooling system in the form of volume flow as a function of the applied pressure. It is particularly favorable when a small pump for the liquid coolant is used, for example a small automotive circulation pump with a typical power of 10 to 30 W which can achieve a volume flow per module of >50 l/h for a pressure loss in the system of 75 to 450 mbar.

Figure 10A:
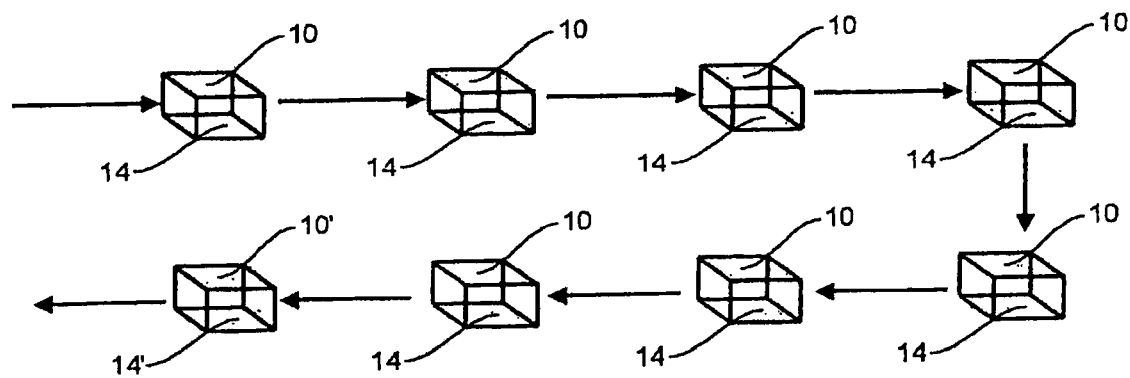
FIGS. 10A-10C are three drawings to explain the possible design of the cooling in a battery module system having eight individual battery modules.

The FIG. 10A shows a possibility of connecting the cooling modules 10 of all eight battery modules 14 in series. This is however not a favorable arrangement because the temperature of the cooling system consisting of the eight cooling modules 10 connected in series with one another continuously rises so that the last module 10' or 14' is the hottest.

Figure 10B:
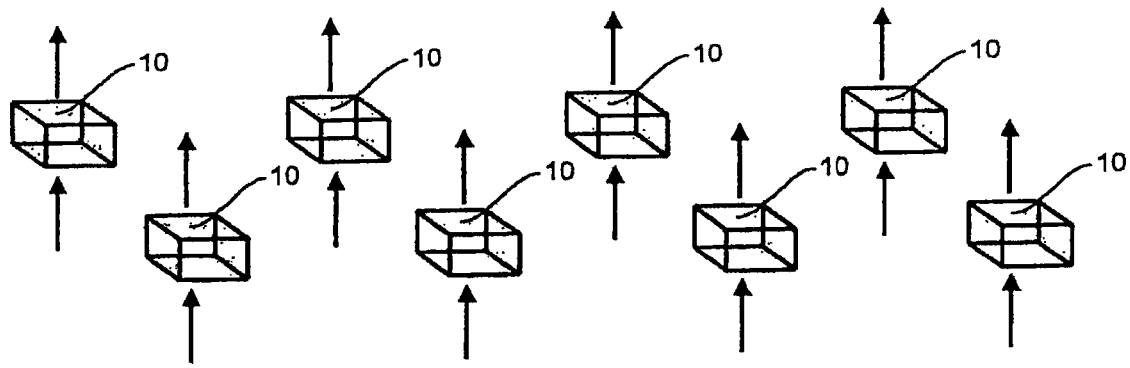

If, in contrast, all cooling modules 10 are connected in parallel in accordance with FIG. 10B then one can ensure in this manner that all modules have the same coolant temperature.

However, if all eight modules are connected in parallel in accordance with this example then one must make an addition of effort in order to ensure that the volume flow is the same for each module 10.

Figure 10C:
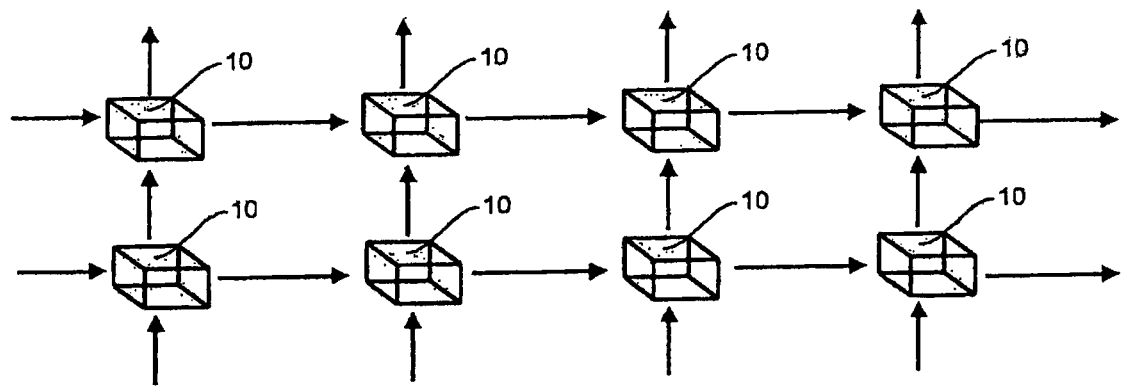

It is more favorable, as shown in FIG. 10C, to use mixed forms in which several cooling paths are arranged in parallel to one another and with a plurality of modules 10 connected in series in each cooling path. The consideration is to decide how many modules are to be connected in series without the temperature difference which arises becoming too large.

After extensive considerations and investigations the applicants are of persuasion that the temperature difference which can be tolerated should not exceed 5° C.

Furthermore it has been found that a cooling system which operates economically and which can be realized economically can then be most favorably realized when, in a battery module system consisting of a plurality of like battery modules 14 with respective cooling modules 10, these are so connected together or can be so connected together that a plurality of cooling circuits 150 arise which are fed via a distributor pipe 152 and also connected to a collector pipe 154. Each cooling circuit 150 can include in each case two to four cooling modules 10 or battery modules 14 in series, with the cooling passages within the battery module 14 each having a free flow cross-section corresponding to that of a pipe having a clear internal diameter of 8 to 9 mm.

Some examples of such a cooling system can be found in the FIGS. 11A to 11D.

Figure 11A:
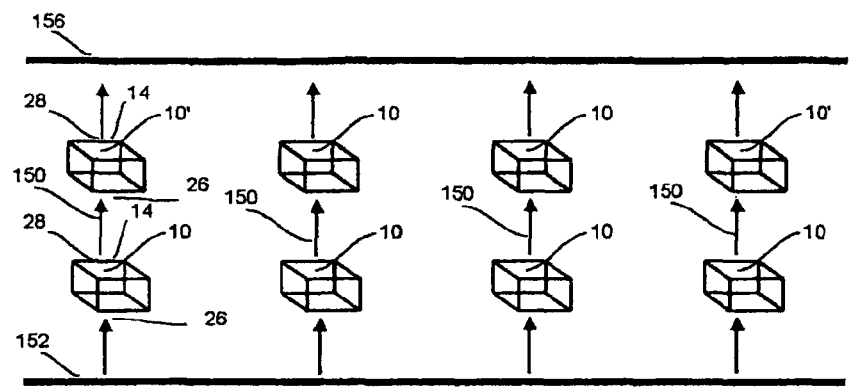
FIG. 11A is a cooling system having in each case two battery modules in series.

In the embodiment of FIG. 11A two battery modules or cooling modules 10 are connected in series in accordance with FIGS. 1 to 3, i.e. each battery module 14 or cooling module 10 has an inlet 26 and an outlet 28 which can be realized by the hydraulic design of each cooling module in accordance with FIG. 9, with the outlet 28 of the first cooling module 10 of the two modules 10, 10' connected in series being connected to the inlet 26 of the next module 10' in the flow direction and the inlet 26 of the first of the two modules 10, 10' connected in series being connected to the distributor pipe 152 and the outlet of the two modules 10' connected in series being connected to the collection pipe 156. Alternatively one could operate here in accordance with FIG. 11B. Here the cooling passages through the individual cooling plates 16, 18 of the respective module 10 are not connected via a connection line 34 but rather each module has two separate inlets 26 and two separate outlets 28 namely one inlet and one outlet for each cooling plate 16, 18. With an arrangement of this kind up to four modules 10 can straightforwardly be connected in series, as shown in FIG. 11B, so that parallel flow paths 158 (four parallel flow paths 158 in FIG. 11B) are produced, with the two rows 160 of modules which results being connected as previously to the distributor pipe 152 and the collecting pipe be 156.

Figure 11B:
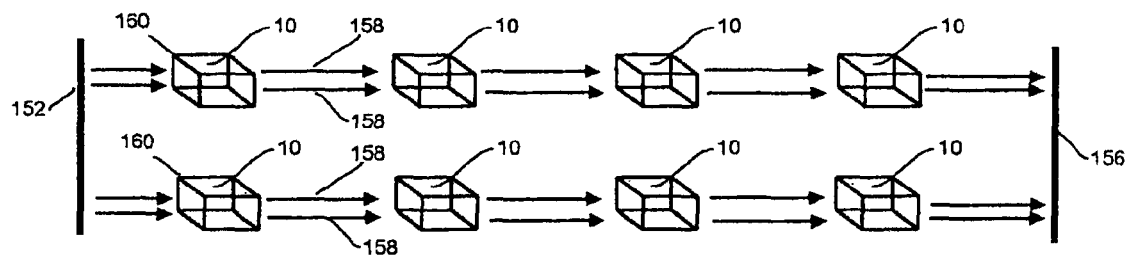
FIG. 11B is a cooling system similar to FIG. 11A but having two separate cooling paths for each battery module.
Figure 11C:
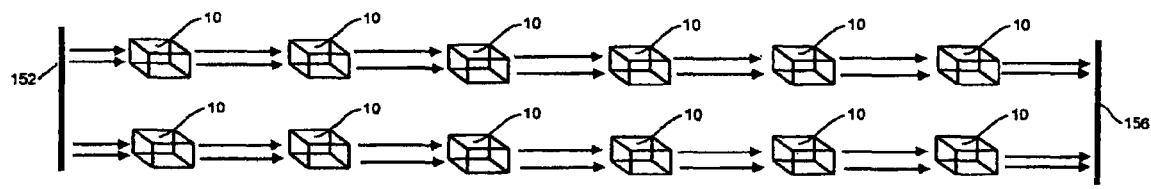
FIG. 11C is a further design of a cooling system having in each case four battery modules in series.
Figure 11D:
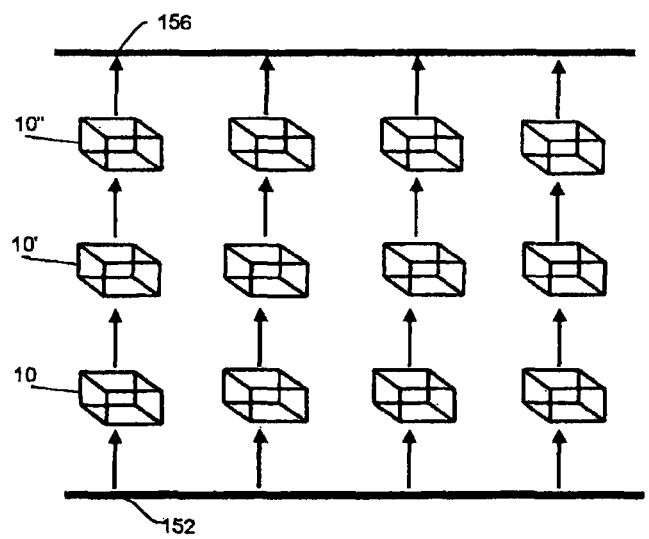
FIG. 11D is a drawing corresponding to FIG. 11B but supplemented by four further modules.

If required, a plurality of cooling modules 10, i.e. battery modules 14 can be connected together with the system correspondingly supplemented in accordance with FIG. 11A or FIG. 11B. For example, if twelve battery modules 14 with twelve cooling modules 10 are provided instead of eight battery modules 14 with eight cooling modules 10 then, in accordance with FIG. 11D, the three battery modules or cooling modules 10, 10', 10" will in each case be connected in series instead of two battery modules or two cooling modules as shown in FIG. 11A. In contrast, with a corresponding extension of the example in accordance with FIG. 11B, in FIG. 11C six modules will in each case be connected in series instead of four modules 10 in FIG. 11B.

The tables in accordance with FIGS. 12A and 12B indicate, for two different power extraction rates (1.5 C and 2 C) how the temperature difference at the cooling modules or battery modules works out in practice, depending on how many modules are connected in parallel to one another and depending here on how many series modules are considered. The values given in FIGS. 12A and 12B apply for a tube diameter of 8 mm which determines an equivalent flow cross-section through the flow passages of the cells.

The areas of the table in accordance with FIGS. 12A and 12B provided with a dot show systems which, for different extraction powers, operate with a temperature difference between inlet and outlet of smaller than 5° C. One can see that the temperature difference depends on the power extraction rate (in these examples 1.5 C and 2 C respectively) and that, for example, a variant with twelve battery modules and up to three modules in series is well suited since reserves are present up to 2 C. Naturally, in this consideration, one not only has to consider the extraction rate but rather, at the same time, also the level of the required quantity of energy which for a smaller vehicle can certainly lie in the range between 16 and 40 kWh. In comparison to a clear internal pipe diameter of 6 mm a significantly better efficiency manifests itself with a clear internal pipe diameter of 8 mm, because the temperature difference ΔT is ca. 50% smaller. In contrast an increase of the clear internal pipe diameter to 9 mm does not lead to any further pronounced improvement.

Figure 13:
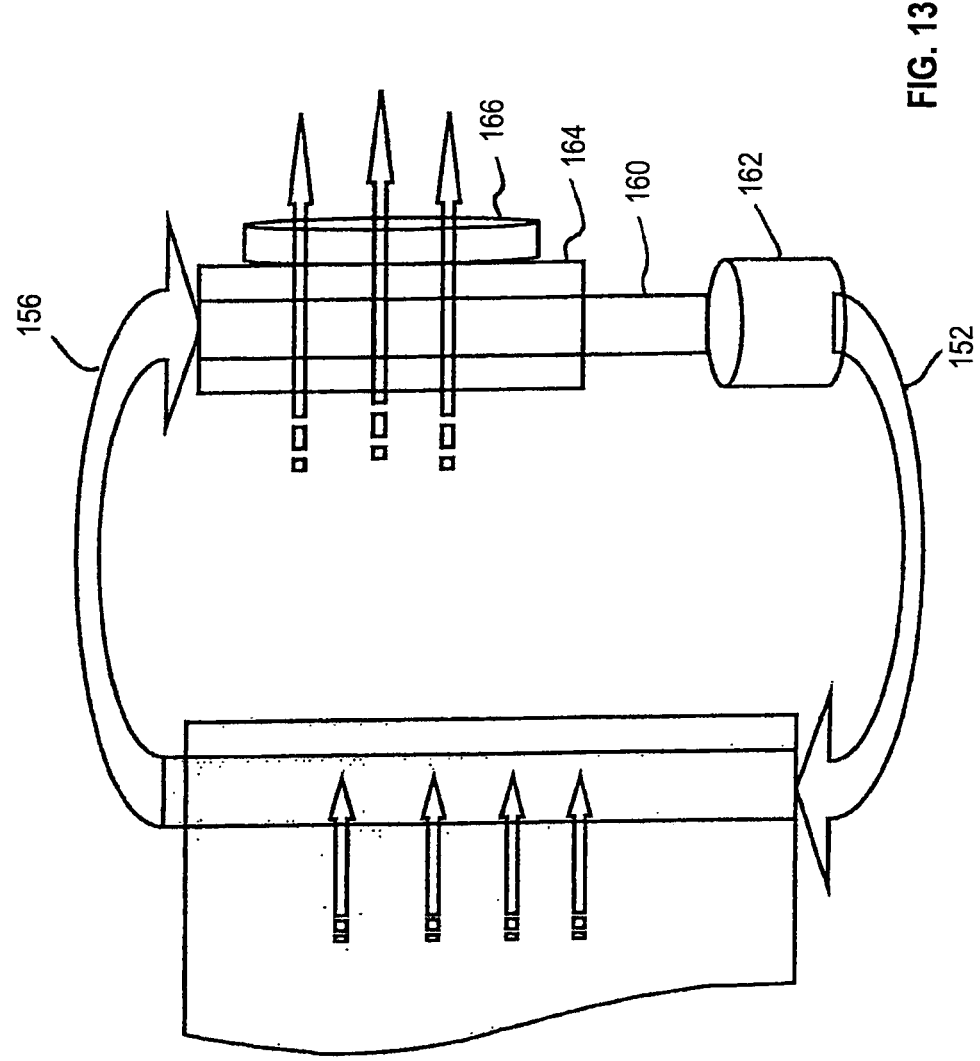
FIG. 13 is a representation of a cooling system having a pump and a radiator with a fan and FIG. 14 is a representation similar to FIG. 13 with a further heat exchanger.

In FIG. 13 one can see that the distributor pipe 152 and the collection pipe 156 communicate with a main line 160 which has a pump 162 and a radiator 164, in this case with fan 166. When the temperature of the coolant threatens to exceed a specific limit, the fan 166 is switched on in order to additionally cool the liquid coolant flowing through a main line and the radiator, i.e. in addition to the normal air flow through the radiator 164, which is correspondingly placed in the vehicle and through which air flowing past the vehicle flows.

Figure 14:
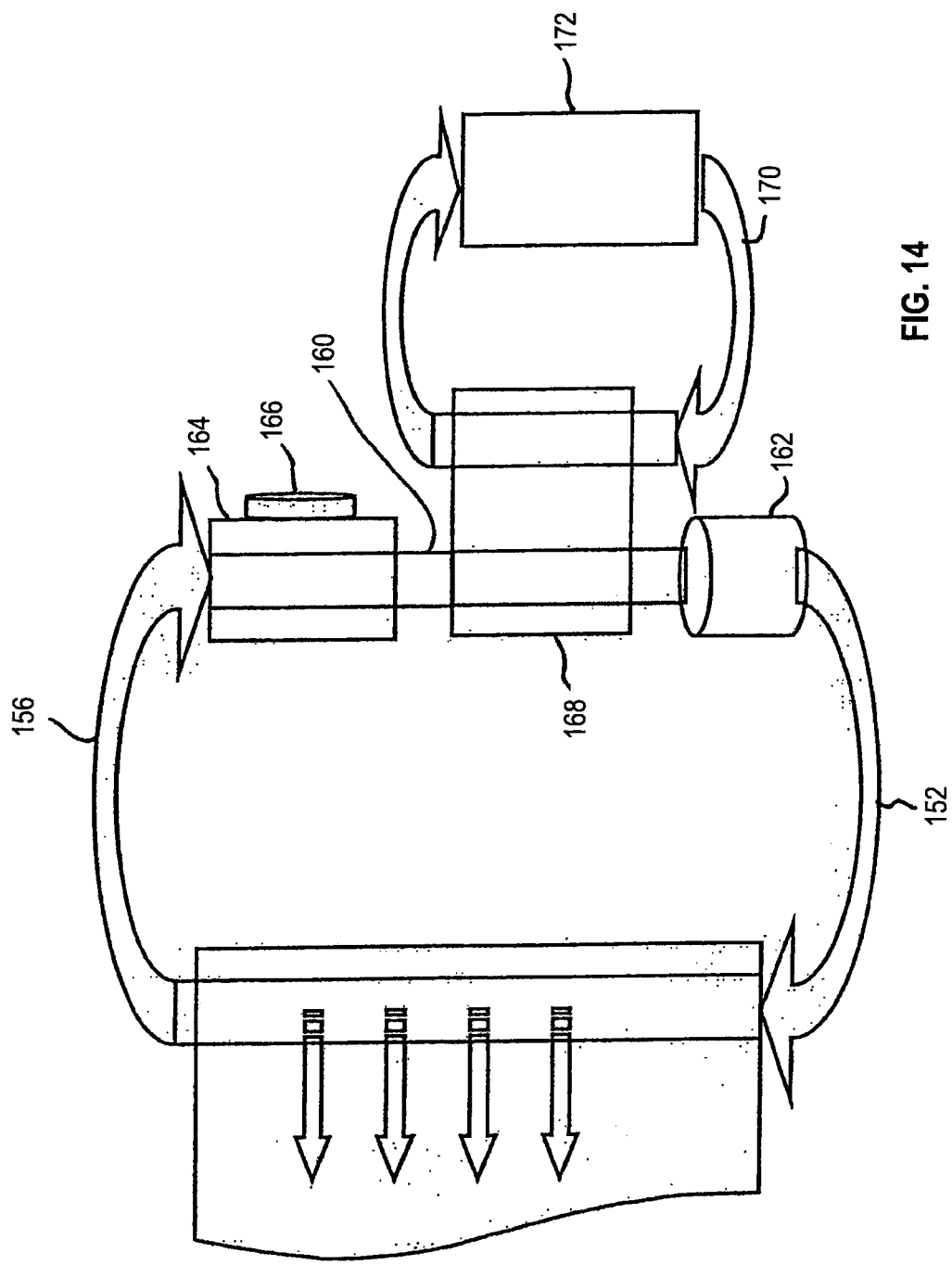

As additionally shown in FIG. 14 the main line 160 can furthermore have a heat exchanger 168 with at least one further circuit which feeds a heating system or an air conditioning system 172. In this manner the excess heat which is removed from the battery modules 14 by the cooling system is used to heat the interior compartment of a vehicle which is equipped with the traction battery system. If required a coolant circuit which is cooled by an air conditioning compressor can serve for additional active cooling of the system. If required the heating can also be supplied with energy from the outside in order to heat the cells 12 of the individual battery modules 14 via the cooling system, insofar as this is necessary in order to bring the cells to a reasonable battery operating temperature level. The cooling system operates then in this mode as a heating system for battery modules. As soon as a reasonable operating temperature is achieved the additional heating is stopped and the vehicle can be taken into operation using the energy of the traction battery system. Should an external energy source not be available for the heating of the battery, for example when the vehicle is parked at night on the road, then a part of the still present energy of the batteries can be used to heat up the batteries, for example by connecting the battery power to an electrical heating device of the heating system 172 which temporarily heats the liquid coolant and a part of the electrical energy can also be used in order to operate the pump 162 and hereby to circulate a heated liquid coolant through the individual cells 12.

Figure 15:
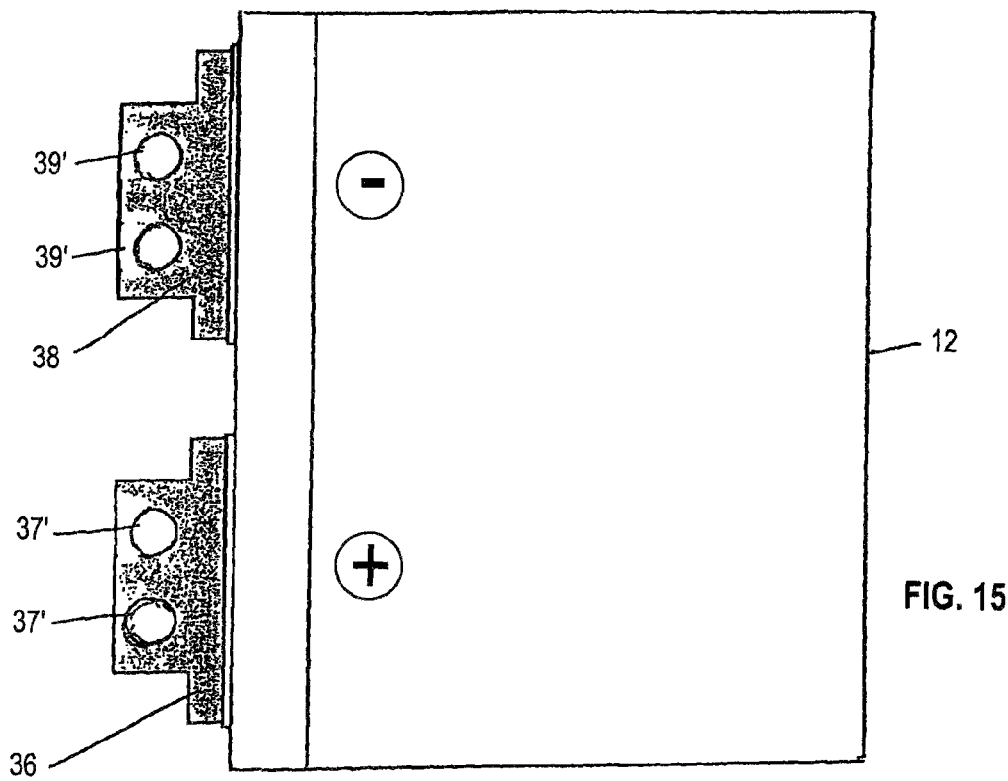
FIG. 15 is a plan view similar to FIG. 2B but in an alternative embodiment.

Referring to FIG. 15 an alternative embodiment of the connection terminals or lugs 36, 38 of the cells 12 is shown. Instead of having U-shaped cutouts 37 and 39 at one side, such as are shown for the connection terminals of FIG. 2B, circular openings 37' and 39' are provided here in the two connection terminals 36, 38 which represent a continuation of the positive (*) and negative (−) electrodes of the cell 12. Although, as also shown in FIG. 2B, two cutouts are provided here in each case a different number of cutouts can also be provided, such as for example the three U-shaped cutouts of FIG. 17A.

The connection terminals 36, 38 themselves consist of sheet aluminum or sheet copper of low thickness such as for example (without restriction) 0.3 mm.

In practice it is relatively difficult to achieve a connection to such a connection terminal of aluminum with a continuously low contact resistance over a period of time of several years. On the one hand, an insulating oxide layer forms on an aluminum sheet in a short period of time. On the other hand, metallic corrosion which exists on contacting of the contact terminals and clamping forces which possibly change over a longer period of time, and which are in turn frequently temperature-dependent, must be counter-acted.

Figure 16A:
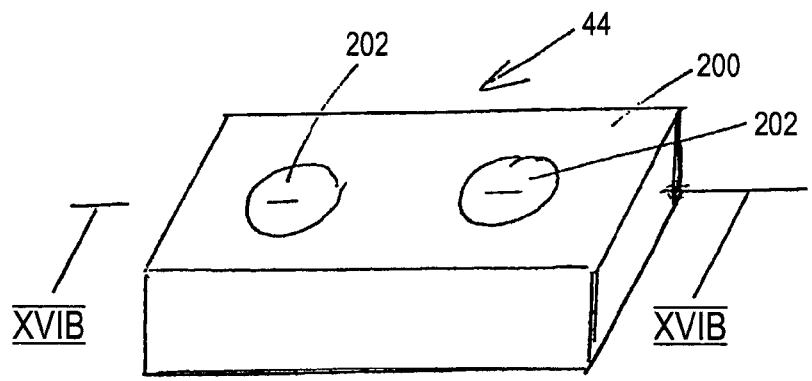
FIGS. 16A and 16B are a perspective illustration and also a sectional drawing of a conductive spacer element.
Figure 16B:
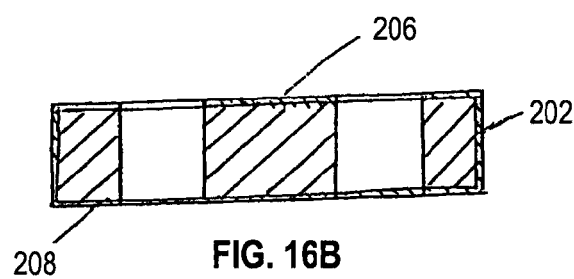
Figure 16C:
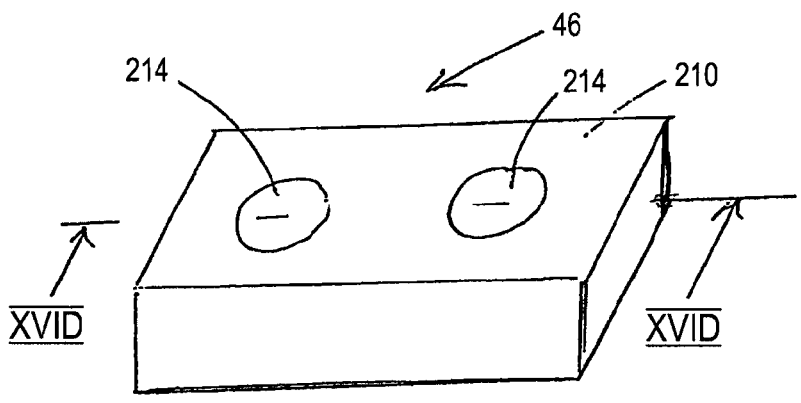
FIGS. 16C and 16D are a perspective illustration and also a sectional drawing of an insulated spacer element.
Figure 16D:
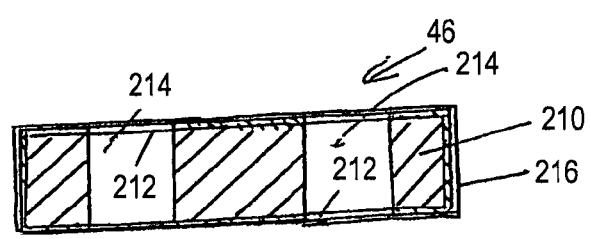

In order to provide assistance here, conductive spacer elements in accordance with FIGS. 16A and 16B and insulating spacer elements in accordance with FIGS. 16C and 16D are preferably used. Spacer elements 44, 46 of the same kind are thus used both for the embodiment of the connection terminals in accordance with FIG. 2B and also for those in accordance with FIG. 15 (i.e. apart from the shape of the cutouts 37, 39 and 37', 39') respectively.

Specifically the conductive spacer element 44 in accordance with FIG. 16A consists of a block 200 of aluminum having the shape of parallelepiped with two through holes 202 which correspond in diameter to the diameter of the circular openings 37' and 39' respectively of the embodiment of FIG. 15 and to the diameter of the rounded base of the U-shaped cutouts 37 and 39 respectively of the embodiment in accordance with FIG. 2B. As can be seen from the sectional drawing in accordance with FIG. 16B (at the section plane XVIB-XVIB of FIG. 16A) the block 200 of aluminum is provided on all sides with a galvanic nickel coating 204. The upper and lower sides 206, 208 of the coated aluminum block are roughened, for example by sand blasting, grinding, brushing or otherwise, whereby smaller raised portions and recesses arise or are present at the said sides 206 and 208. These dig slightly into the surface of the connection terminals 36, 38 on clamping of the battery module, break-through the oxide layer there and produce an excellent contact with the connection terminals. The nickel coating 204 can also be provided inside the holes 202, this is however not necessary.

The insulating spacer elements 46 of FIGS. 16C and 16D have a shape which is at least substantially identical to that of the spacer elements 44 of FIGS. 16A and 16B. Here also they consist of an aluminum block 210 having the shape of a parallelepiped. In order to ensure that the so conceived spacer elements are insulating the corresponding aluminum blocks are anodized over their full area whereby a thin high quality insulating layer 212 arises on all surfaces of the blocks. If the bores 214 have already been manufactured previously, then this anodized layer is also present in the bores 214 (not shown). In order to ensure that any damage to the anodized layer, which is in any event hard, does not lead to an undesired conducting transition between the insulating spacer element 46 and a conductive spacer element 44 or to a connection terminal 36, 38 of the battery cell a further insulating layer 216 is deposited on the anodized layer. This layer 216 can, even if not so shown in FIG. 16D, also be deposited within the bores 212, optionally on an anodized layer provided there. The insulating layer 216 is a very thin layer of an organic or inorganic compound or a paint layer or an insulating paint or a resin layer of a corresponding insulating resin.

The nickel layer 204 of the conducting spacer element in accordance with FIGS. 16A, 16B and the anodized layer 212 and also the insulating layer 216 applied thereon are kept comparatively thin, for example approximately 200 µm for the nickel layer 204 and the anodized layer 212 and approximately 300 µm for the insulating layer 216. Since both the conductive spacer elements 44 and also the insulating spacer elements 46 consist at least substantially of aluminum, the thermal expansion of the spacer elements as a whole correspond approximately to the thermal expansion of aluminum. Furthermore, as the clamping bolts preferably consist of aluminum it is ensured (because the thermal expansion coefficients of the parts other than the thin coatings are at least substantially the same) that after tightening of the nuts of the threaded bolts an at least substantially constant clamping force arises between the conductive spacer elements 44, the insulating elements 46 and the connection terminals of the battery cells of the battery module irrespective of what temperature fluctuations arise in practice. This clamping force not only ensures that the unevenness of the nickel coating 204 of the conducting spacer elements produces a good electrical contact to the connection terminals of the battery cells but rather the clamping pressure also leads to a type of seal between the surfaces which contact one another so that moisture or corrosion promoting substances cannot straightforwardly lead to a deterioration of the conducting transitions between the conducting spacer elements 44 and the connection terminals 36, 38.

The use of aluminum as a basic material of the conducting spacer elements 44 and of the insulating elements 46 lend itself because, on the one hand, this is the same material as the connection terminals 36, 38 and, on the other hand, aluminum has a low density so that the weight of the battery module can be kept small. It would however also be conceivable to make both the conducting spacer elements and also the insulating spacer elements of a different material, it would then be appropriate to make the clamping bolts of the same material or of a material with a comparable coefficient of thermal expansion in order to achieve the desired at least substantially constant clamping force.

Figure 17:
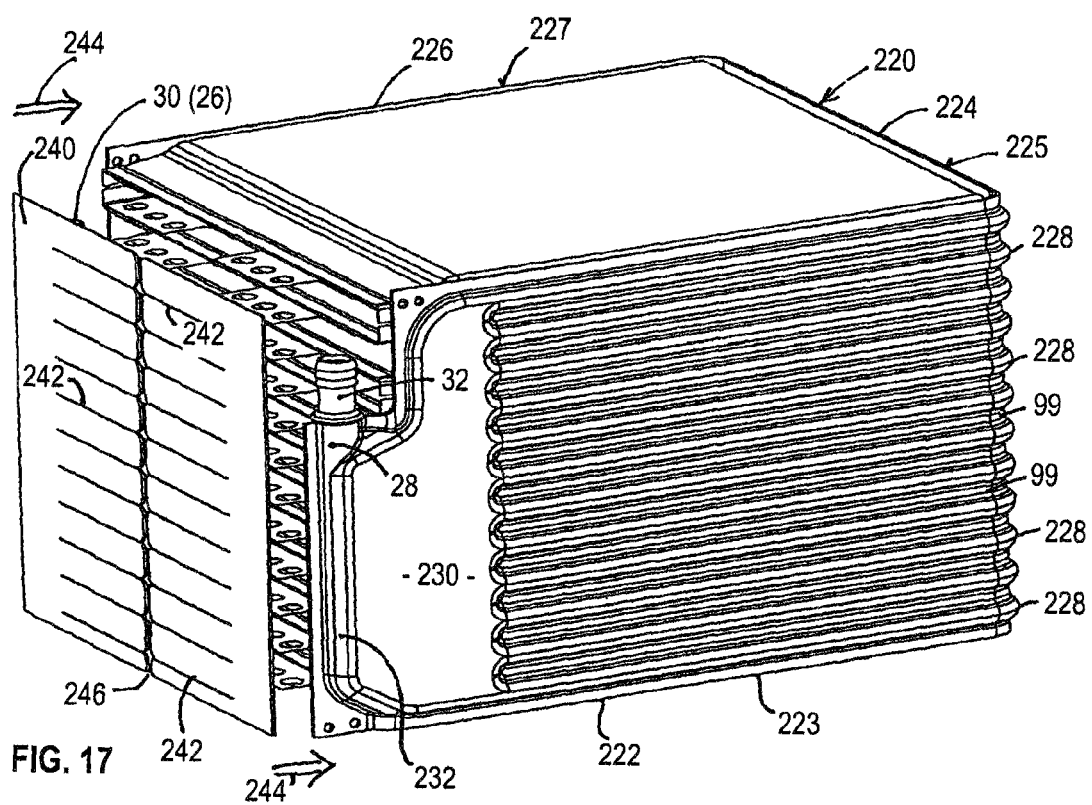
FIG. 17 is a perspective representation of a separating comb for the individual cell terminals of the cells of the battery module in front of a modified cooling module.

FIG. 17 shows an alternative embodiment of the cooling plates 16, 18 of the FIG. 1. These cooling plates are converted in FIG. 17 into a unitary structure so that a three-sided cooling plate arrangement 220 results. More specifically, the cooling plate 222 at the right-hand side 223 of the cooling module 220 of FIG. 17 merges via a cooling plate 224 at the rear side 225 of the cooling module 220 into the cooling plate 226 of the left-hand side 227. Furthermore, the cooling passages 228 of the cooling plates are made parallel in the sense that all individual cooling passages 228 of the cooling plates are guided parallel to one another and with a uniform spacing around the three sides 223, 225, 227 of the cooling module and extend between a distribution passage at the left-hand side 227 on the cooling module 220 via the rear side 225 to a collection passage 230 at the right-hand side 223 of the cooling module 230.

The distribution passage at the left-hand side 226 is identically constructed to the collection passage 230 at the right-hand side 22. The collection passage 230 communicates via a long narrow connection passage 232 with the tube-like outlet 28 having the hose connection gland 32. In just the same way the tubular inlet 26 with the hose connection gland 30 communicates via an elongate connection passage (not visible in FIG. 17) with the distribution passage (likewise not visible). Liquid coolant thus flows through the hose connection gland 30 between the tube-like inlet 26 from their via the said elongate connection passage in the distribution passage into the individual passages 228 of the cooling module 220 which extend parallel to one another across the left-hand side 227 of the cooling module 220 and subsequently across the rear side 225 of the cooling module and across the right-hand side 223 of the cooling module 220 into the collection element 230 and then via the elongate connection passage 232 to the tubular outlet 28 and via the hose connection gland 32 into the cooling circuit again.

In this embodiment the sheet metal cooling plates and the connection plates 20 are provided with side parts with right angles at the left-hand side 227 and the right-hand side 223 through the cooling modules 220 and also at the rear side 225 and these are then adhesively bonded, welded or soldered onto planar sheet metal parts at the inner left, rear and right sides 227, 225 and 223 of the cooling module 220 in order to produce a good thermal transition between the connection plates 20 and the cooling plates at the three sides 227, 225, 223.

The outer side of the cooling plate regions 222, 224, 226 of the cooling module 220 is likewise formed by a sheet metal part which is depressed, in a similar manner to the sheet metal part of FIGS. 7A to 7D at positions in order to form ribs 99 which form the coolant passages 222 including the connection passage from the tubular inlet 26 into the distribution passage and the transition on the other side of the cooling module 220 into the collection element 230 and the connection passage 232 into the tubular outlet 26. The inner planar sheet metal parts are connected to the outer sheet metal parts by means of adhesive bonding, welding, soldering or otherwise.

FIG. 17 furthermore shows a comb-like part 240 with slots 242 which are arranged at the spacing of the individual connection terminals 36, 38 of the individual cells and have dimensions which receive the connection terminals. In this manner the comb-like insulating plate 240 can be pushed as the arrows 244 show onto the connection terminals 36, 38 of the cells in order to hold these in ordered arrangement and in order to ensure that the insertion of the conducting spacer elements 44 and the insulating spacer elements 46 can be introduced in ordered manner between adjacent connection terminals 36, 38.

A like plate can also be provided with the battery module of FIG. 2A and here it is possible for the rear side of the cooling modules to be opened, to push the cells forwardly through the slits 242 of the comb-like plate and also to push the plate onto the already installed cells.

In FIG. 17 the comb-like plate is shown with a central stiffening rib 246. This is however not absolutely essential.

Figure 18:
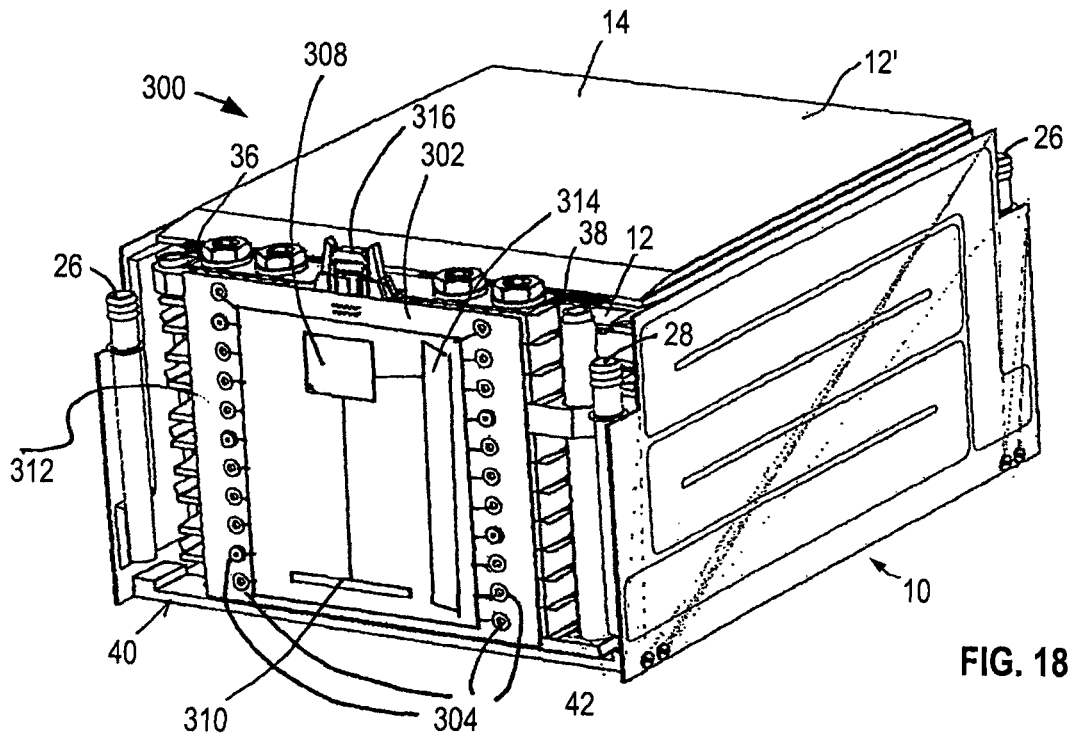
FIG. 18 is a perspective illustration of a battery module unit in accordance with the invention without a housing similar to that of the FIG. 2A but with further details of the circuit board.

FIG. 18 shows a battery module unit 300 without a housing. In this example a circuit board 302 (see also FIG. 19) is connected to the conducting spacer elements 44 by means of screws 304 and spring contacts, which are not shown because they are arranged beneath the circuit board, with the spacer elements being arranged between the individual terminals 36, 38 of the battery cells 12. The spring contacts can have in the form of spring discs or coil springs or other spring elements. They can also be omitted if a direct contact which is produced by the screw or by soldered joints at the rear side is sufficient.

The circuit board 302 has a processor 308, in particular a digital signal processor (DSP) 308 which is designed to detect with a sampling rate of at least 10 Hz preferably at least 20 Hz the voltages of the individual battery cells 12, to digitalize these in an analog/digital converter (ADC) 310 with a 12 bit rate. The circuit board 302 forms together with its components, optionally together with an attached evaluation unit 18 (see FIG. 19) and/or control, a battery management system 312.

Furthermore, the DSP 308 is designed to detect the temperature of the battery module 14 by sampling at at least one point of the battery module 14, preferably at seven points of the battery module 14, and more precisely stated at seven points between the individual battery cells 12, to store the measured temperatures and voltages in a flash memory 314 and optionally to make them available via an interface 316, which is preferably a CAN bus interface 316 or an RS485 interface 316, to an external evaluation unit 318, which optionally can also be integrated on the circuit board. Furthermore the DSP 308 can be placed into different states of rest in order to save power for longer non-use of the battery module 14. The DSP 308 can be activated at preset intervals of time in order to check the actual state of the individual battery cells 12 of the battery module 14.

Figure 19:
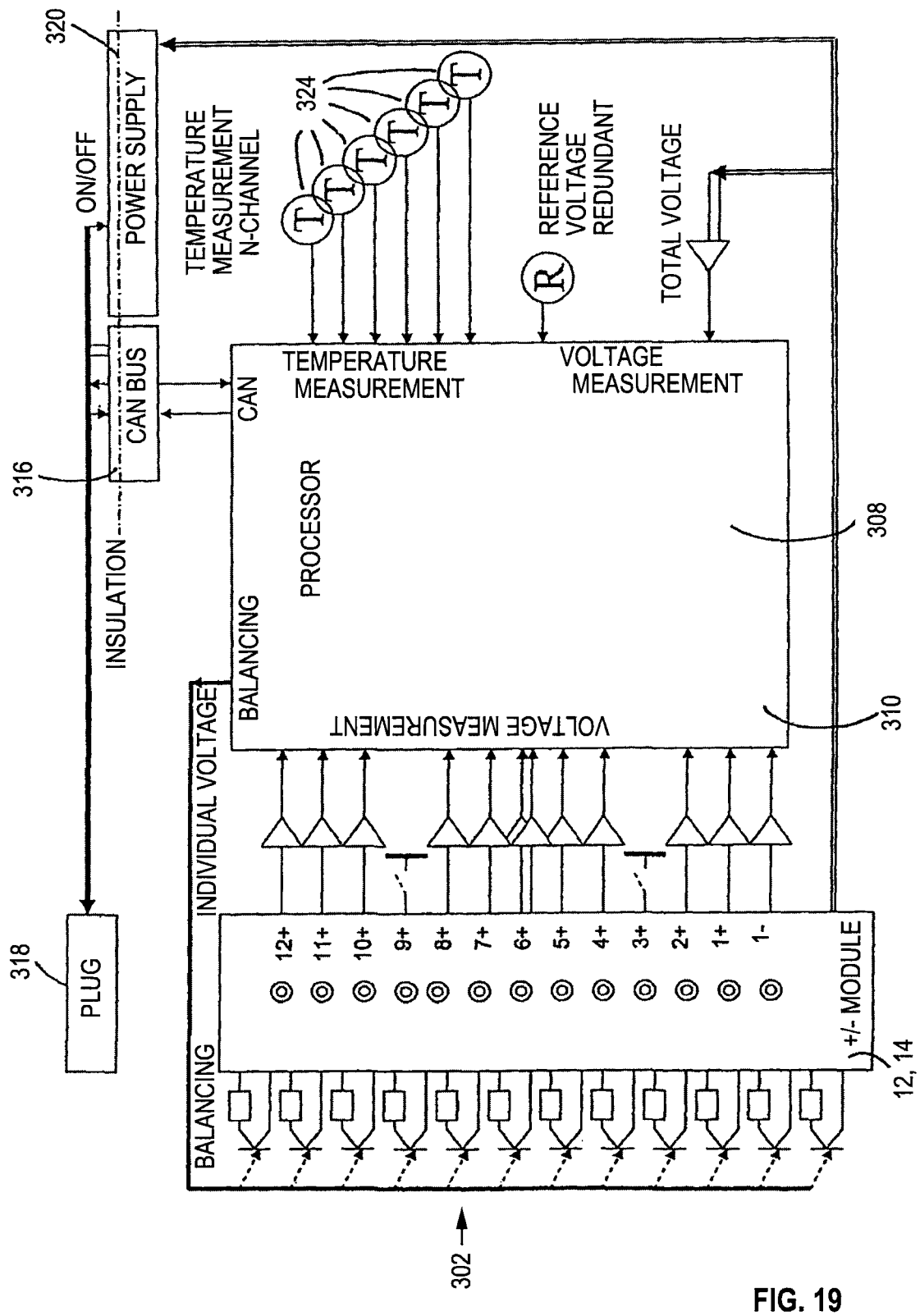
FIG. 19 is a circuit concept for a circuit board of the battery management system of the invention.

As indicated in FIG. 19 the respectively measured voltage difference of a battery cell 12 which is tapped of at the terminals 36, 38 (see FIG. 21) can be made available to the DSP 308. The charging or discharging process of the individual battery cells 12 is controlled by the DSP 308 via a balancing circuit 306 (see FIG. 20). Furthermore, the measured temperatures of the battery module 14 and/or the battery cells 12 are made available for the DSP 308 in order to monitor and/or regulate the heating process or cooling process of the battery module 14.

The measured data values (temperature and/or voltage) can be made available to the evaluation unit 318 via a CAN interface 316 in that the data values are digitalized in an ADC 310 in a process initiated by the DSP 308. Further the FIG. 19 also shows that the circuit board 302 of the battery management system can be coupled to an external power supply 320 which can be realized by a small additional battery or an electrical store (for example a capacitor) which is charged by the other battery modules 14. This ensures that even with a defect of the battery module 14 this can be detected and thus also conveyed to the evaluation unit 318 or to a user of the vehicle (not shown).

Figure 20:
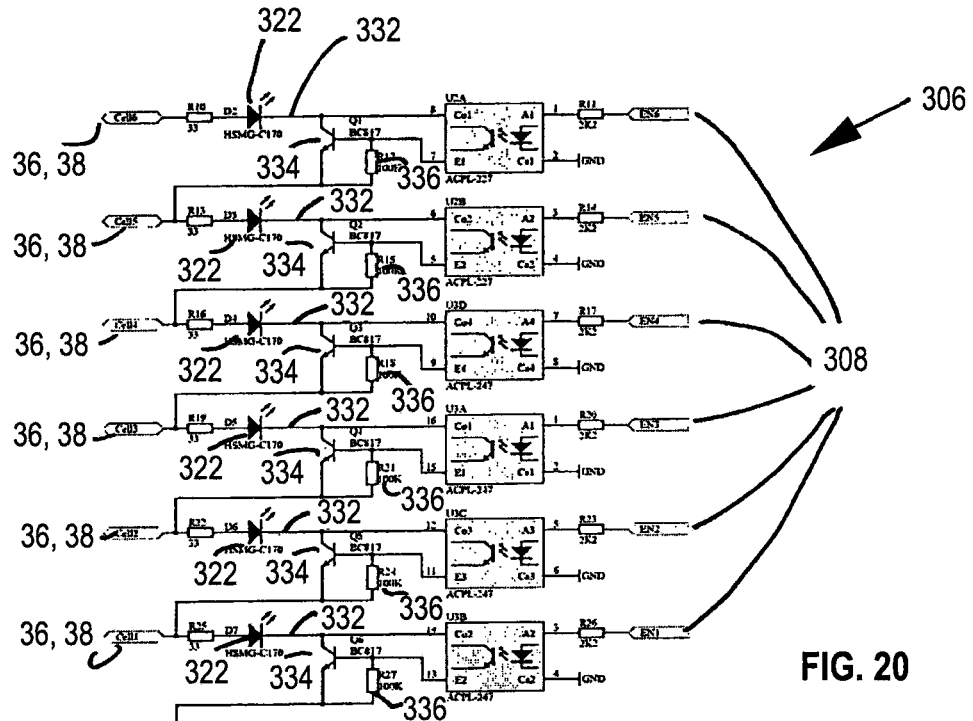
FIG. 20 is a circuit for the regulation of the charging process of the individual battery cells.

The FIG. 20 shows an arrangement of a balancing circuit 306 that is used which controls and/or regulates the rate of charge and/or discharge of the various cells 12 of a battery module 14. FIG. 20 shows the balancing circuit 306 only for seven cells 12, in actual fact the number of the individual balancing circuits 332 i.e. of the measured voltage differences corresponds to the respective number of cells present in the battery module 14. As shown in FIG. 20, the state of charge of the individual battery cells 12 can be optionally visualized by means of an LED 322 or indicated to the driver of the vehicle by means of a suitable display in the vehicle. If no LED 322 be used, a diode is arranged in its place on the circuit board 302 in order to regulate the voltage drop of the individual cells.

In the present example, the voltage differences present at the terminals 36, 38 of a battery cell 12 are connected to inputs of the DSP 308 and also connected by means of a transistor circuit 334 to the respectively adjacent battery cell 12. The DSP 308 thereby regulates the voltage drop between the individual battery cells 12 by means of the transistor in order to ensure that the individual battery cells 12 are uniformly charged and discharged in order to ensure that the individual battery cells 12 of the battery module 14 have the same state of charge. Typical charging or discharging rates amount (without restriction) to 1C to 5C, these are dependent on the material of which the battery cells 12 made. Such balancing circuits 306 are best known per se.

Figure 21:
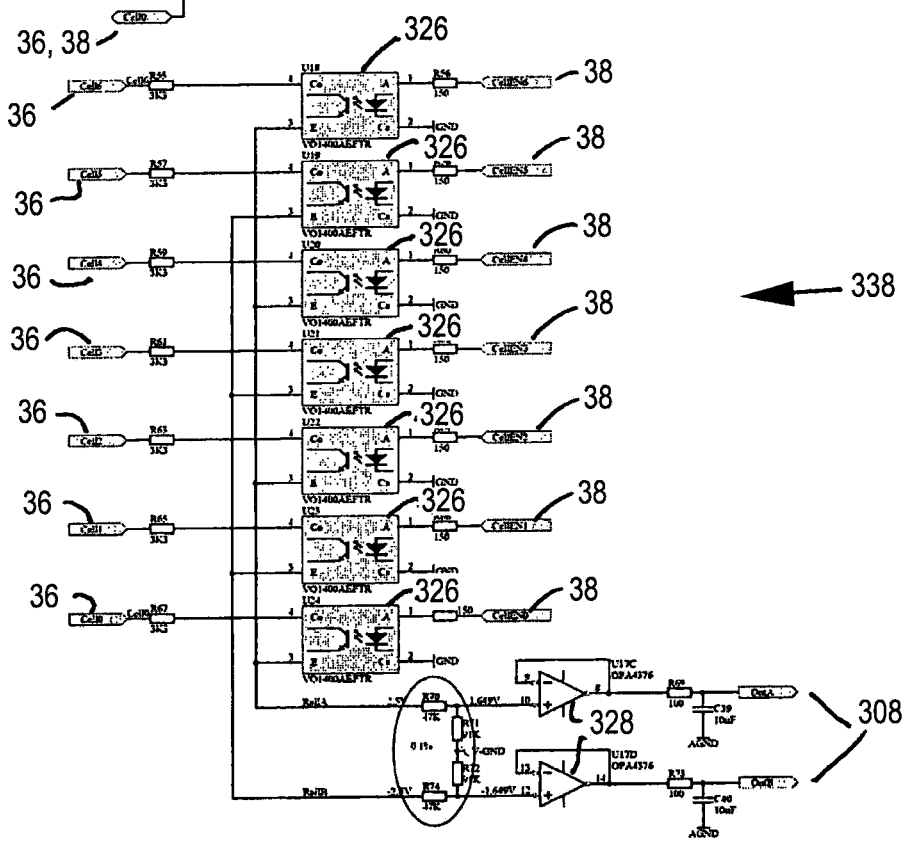
FIG. 21 is a circuit for the voltage measurement of the individual battery cells.

FIG. 21 shows in example for a circuit with which the voltages of individual battery cells 12 can be measured. Here also only some of the terminals 36, 38 of the battery cells 12 of a battery module 14 are shown. The precise number of the respective terminals 36, 38 corresponds to the number of the battery cells 12 present in a battery module unit. Stated more precisely, the FIG. 21 shows a multiplexer circuit 338. In this, the voltages of the individual terminals 36, 38 of the battery cell are respectively connected to the DSP 308 by means of an operation amplifier 328 in order to minimize errors in the voltage measurement. The voltages present at the terminals 36, 38 are respectively measured with a reference value, for example a common earth and subsequently conveyed from the respective multiplexer 326 to the associated amplifier 328.

In the multiplex process a plurality of input signals are read in by a multiplexer 326, this then transmits the individual input signals by means of an output line to an amplifier 328 which can be seen in the lower region of FIG. 21. The individual input signals can be interrogated with reference to a control signal and thereby enables the individual voltages of the individual terminals 36, 38 to be respectively separately amplified in the same amplifier 328 so that the individual voltages can always be measured with the same systematic errors.

Since the individual voltages of the respective terminals 36, 38 are measured independently of one another and are worked respectively subtracted from one another this systematic error is also subtracted at the same time in the calculation of the individual voltages of the battery cells 12, so that more precise measurement data is present. As can be seen from FIG. 21 the individual multiplexers 326 are fed into two different readout lines in order to accelerate the readout rate of the individual voltages of the battery cells 12. It is also conceivable to use a smaller number of multiplexers 326 or also only one multiplexer 326 instead of a plurality of multiplexers 326, since a multiplexer 326 can also operate with more than two different input signals.

The measured voltages are subsequently amplified by means of a suitable amplifier 328 in order to more rapidly detect defects in the individual battery cells 12. Individual voltage signals can also be connected to a high pass filter for impedance measurement. Generally the aim is to carry out a voltage measurement which has a resolution of smaller than 4 mV. The measurement accuracy should amount to 1 mV, which permits an independent total voltage measurement which can be served to detect individual channel errors of the respective battery cells 12 in the battery module 14.

Figure 22:
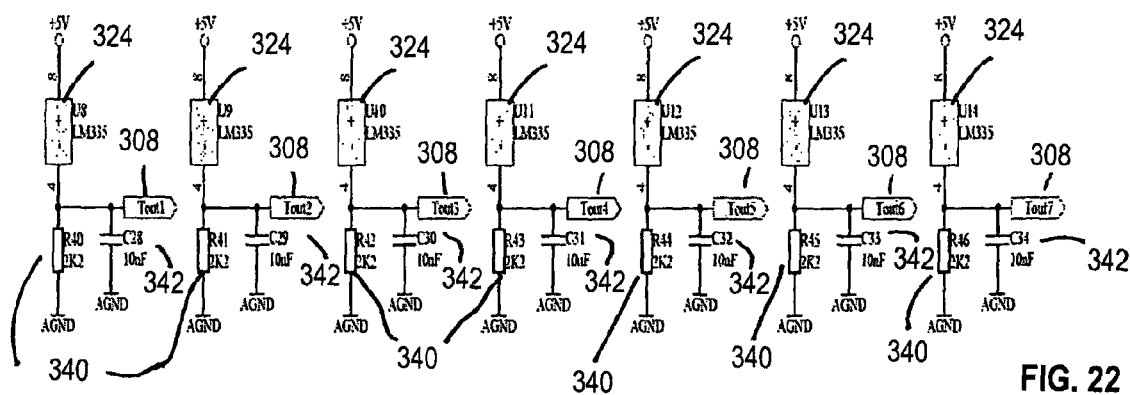
FIG. 22 is a circuit for a temperature measurement of the individual battery cells.

FIG. 22 shows a possible circuit for temperature measurement in which seven temperature sensors 324 are connected by means of a suitable circuit in each case with the DSP 308, with the individual temperature sensors 324 being connected to a 5 V supply voltage which serves to supply the output voltage of the individual temperature measuring sensors 324, which are proportional to the temperature and thus required for the temperature determination. Moreover, the individual temperature sensors 324 are connected to a resistor 340 and to a capacitor 342 in order to ensure that all temperature measurements have the same output impedance, which minimizes the error in the individual temperature measurements.

In the specific embodiment the temperature sensors 324 are LM335 sensors (available from the company National Semiconductor) which represent the IC temperature sensors 324. The LM335 is a member of an IC family which changes its output voltage by 10 mV by degree Kelvin temperature change. The LM335 has a temperature range of −40° C. to +100° C. The advantages of an LM335 temperature sensor 324 are that this can have an accuracy of one degree (at 25° C.) even without calibration and are relatively inexpensive. However, other temperature sensors such as NTC resistors, PT100 platinum resistors or also digital temperature sensors can be used.

Figure 23:
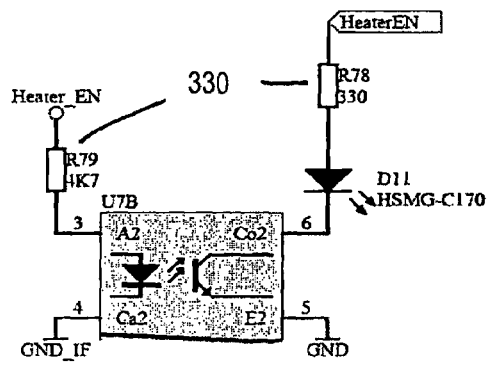

FIG. 23 shows in a schematic overview a possible component arrangement for a resistance heater which can be arranged on the circuit board 302. The resistance heater is used in order to heat the conducting spacer elements 44 and thereby the terminals 36, 38 of the battery cell 12. The DSP 308 is designed in order to start a heating or cooling process by means of measured temperatures of the battery module 314 in that the DSP 308 permits a current to flow through a resistance 330 which heats up the resistor 330. The thereby generated heat is transmitted as a result of the thermally conducting connection from the connection elements 44 to the terminals 36, 38 and thus the battery cells 12 of the battery module 14 are so to say heated from the middle of the cells 12. The resistance heater is typically heated with 1 W/cell, this power can however be changed depending on requirement.

Figure 24:
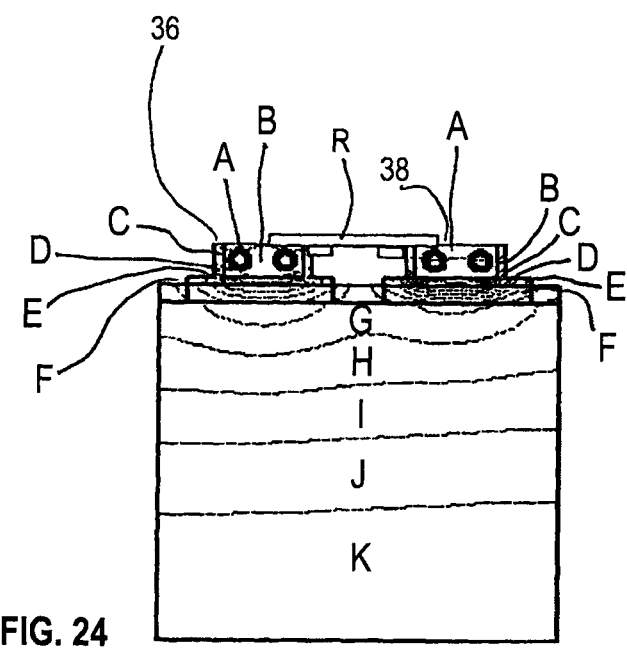
FIG. 23 is a circuit for the heating of the battery cells and FIG. 24 is an example for the temperature profile within a battery cell.

FIG. 24 shows the temperature profile of a battery cell 12 heated by means of a resistance heater. In particular one can see from FIG. 24 how the temperature profile changes from the terminals 36, 38 up to the other end of the battery cell 12. Should the measured temperature now be greater than 5° C., than the resistance heating is switched off, should the measured temperature be >30° C. the cooling of the cooling module 220 is activated in order to ensure that the battery cells 12 cannot be overheated.

The invention claimed is:

1. A battery management system for a battery module having a plurality of battery cells which each have positive and negative terminals wherein the battery management system is arranged on a circuit board and the circuit board has a plurality of electrical contacts which can be brought into direct contact with conducting elements of the battery cells, with the conducting elements being formed by at least one of the terminals of the battery cells of the battery module and by conducting spacer elements which are provided between adjacent terminals of the battery cells, wherein circuits are arranged on the circuit board for the monitoring of at least one of temperatures of the battery cells and voltages of the battery cells, and wherein the individual circuits are arranged between the said contacts of the circuit board to the individual battery cells in the region of the circuit board between the terminals and are arranged between the conducting spacer elements of the battery cells.

2. A battery management system in accordance with claim 1, wherein the terminals and the conducting spacer elements are arranged on one side of the battery module and form a contact plane in which the circuit board has at least one of electrical and thermal contact to at least one of the terminals and to the spacer elements.

3. A battery management system in accordance with claim 1, wherein the battery management system includes at least one interface, at least one automotive interface, a processor, a flash memory, an ADC and a current supply.

4. A battery management system in accordance with claim 1, wherein it is designed to carry out at least one of the following tasks selected from the group comprising:
  measuring voltage differences or values proportional thereto at different points of the battery cells;
  monitoring the measured voltages of the battery cells;
  monitoring the state of charge of the battery module with reference to the measured voltages of the battery cells and to regulate them by changing resistances associated with the battery cells; and
  at least temporarily storing the measured voltage differences.

5. A battery management system in accordance with claim 1, wherein it is designed to carry out at least one of the following tasks selected from the group comprising:
  measuring temperatures from at least one point of the battery module; and
  at least temporarily storing the measured temperatures.

6. A battery management system in accordance with claim 1, wherein it is designed to monitor the measured temperatures.

7. A battery management system in accordance with claim 1, wherein the circuit board further comprises heating resistors associated with the battery cells which serve for the heating up of the battery cells, said heating resistors contacting either of the terminals of the cells or the conducting spacer elements.

8. A battery management system in accordance with claim 1, wherein it is designed to initiate at least one of the following processes: a heating process when a measured temperature amounts to less than a prespecified minimum temperature and a cooling process when the measured temperature amounts to more than a prespecified maximum temperature.

9. A battery management system in accordance with claim 1, wherein the circuits are arranged on the circuit board in the region of the contact plane.

10. A battery management system in accordance with claim 1, wherein a signal processing device is arranged on the circuit board and wherein the signal processing device is designed to carry out at least one of the following tasks selected from the group comprising:
   converting at least one of measured temperatures, measured voltages, monitored temperatures and monitored voltages into digital signals which are evaluated in an evaluation unit;
   modulating the digital signals onto at least one of the output voltage of the battery cells and the output voltage of the battery module which is made available by the connection lines of the battery module, whereby the digital signals are measured by an evaluation unit via the connection lines of the battery module; and
   at least temporarily storing the digital signals,
   wherein if the digital signals are temporarily stored an evaluation unit provided for this purpose can be decoupled from the circuit board.

11. A battery management system in accordance with claim 1, wherein the contact between the battery management system and the battery module is established by at least one of screws and spring contacts.

12. A battery management system in accordance with claim 1 in combination with a battery module unit consisting of a plurality of cells connected to one another which each have a positive and a negative terminal, wherein the terminals which are provided with cutouts are arranged in at least first and second rows such that broad sides of adjacent terminals of a respective row confront one another, wherein, the terminals of each row are held spaced from one another by systematically arranged conducting spacer elements and an optionally insulating spacer element, wherein the cells are connected electrically in series and/or parallel to one another inside the module by a systematic arrangement of their positive and negative terminals in the first row or in the second row and wherein the terminals of each row and also the spacer elements arranged there between are pressed against one another by a clamping device.

13. A battery management system in combination with a battery module unit consisting of a plurality of cells connected to one another which each have a positive and a negative terminal, wherein the terminals which are provided with cutouts are arranged in at least first and second rows such that broad sides of adjacent terminals of a respective row confront one another, wherein the terminals of each row are held spaced from one another by systematically arranged conducting spacer elements and an optionally insulating spacer element, wherein the cells are connected electrically in series and/or parallel to one another inside the module by a systematic arrangement of their positive and negative terminals in the first row or in the second row and wherein the terminals of each row and also the spacer elements arranged therebetween are pressed against one another by a clamping device, and wherein the battery management system is arranged on a circuit board and the circuit board has a plurality of electrical contacts which can be brought into direct contact with conducting elements of the battery cells, with the conducting elements being formed by at least one of the terminals of the battery cells of the battery module and by conducting spacer elements which are provided between adjacent terminals of the battery cells.

14. The battery management system in accordance with claim 13, wherein the terminals and the conducting spacer elements are arranged on one side of the battery module and form a contact plane in which the circuit board has at least one of electrical and thermal contacts to at least one of the terminals and to the spacer elements.

15. The battery management system in accordance with claim 13, wherein the battery management system includes at least one interface, at least one automotive interface, a processor, a flash memory, an ADC, and a current supply.

16. The battery management system in accordance with claim 13, wherein it is designed to carry out at least one of the following tasks selected from the group comprising:
   measuring voltage differences or values proportional thereto at different points of the battery cells;
   monitoring the measured voltages of the battery cells;
   monitoring the state of charge of the battery module with reference to the measured voltages of the battery cells and to regulate them by changing resistances associated with the battery cells; and
   at least temporarily storing the measured voltage differences.

17. The battery management system in accordance with claim 13, wherein it is designed to carry out at least one of the following tasks selected from the group comprising:
   measuring temperatures from at least one point of the battery module; and
   at least temporarily storing the measured temperatures.

18. The battery management system in accordance with claim 13, wherein it is designed to monitor the measured temperatures.

19. The battery management system in accordance with claim 13, wherein the circuit board further comprises heating resistors associated with the battery cells which serve for the heating up of the battery cells, said heating resistors contacting either of the terminals of the cells or the conducting spacer elements.

20. The battery management system in accordance with claim 13, wherein it is designed to initiate at least one of the following processes: a heating process when a measured temperature amounts to less than a prespecified minimum temperature, and a cooling process when the measured temperature amounts to more than a prespecified maximum temperature.

21. The battery management system in accordance with claim 13, wherein circuits are arranged on the board for the monitoring of at least one of temperatures of the battery cells and voltages of the battery cells.

22. The battery management system in accordance with claim 21, wherein the individual circuits are arranged between the said contacts of the circuit board to the individual battery cells in the region of the circuit board between the terminals and are arranged between the conducting spacer elements of the battery cells.

23. The battery management system in accordance with claim 21, wherein the circuits are arranged on the circuit board in the region of the contact plane.

24. The battery management system in accordance with claim 13, wherein a signal processing device is arranged on the circuit board, and wherein the signal processing device is designed to carry out at least one of the following tasks selected from the group comprising:
   converting at least one of measured temperatures, measured voltages, monitored temperatures, and monitored voltages into digital signals which are evaluated in an evaluation unit;

modulating the digital signals onto at least one of the output voltage of the battery cells and the output voltage of the battery module which is made available by the connection lines of the battery module, whereby the digital signals are measured by an evaluation unit via the connection lines of the battery module; and at least temporarily storing the digital signals, wherein if the digital signals are temporarily stored an evaluation unit provided for this purpose can be decoupled from the circuit board.

25. The battery management system in accordance with claim 13, wherein the contact between the battery management system and the battery module is established by at least one of screws and spring contacts.

* * * * *